(12) United States Patent
Stange et al.

(10) Patent No.: US 10,967,395 B2
(45) Date of Patent: Apr. 6, 2021

(54) IRRIGATION CONTROLLER WITH ROBUST GROUND PATH

(71) Applicant: Hunter Industries, Inc., San Marcos, CA (US)

(72) Inventors: Richard C. Stange, Oceanside, CA (US); David M. Hurrle, Encinitas, CA (US); Kok Huat Chong, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 43 days.

(21) Appl. No.: 16/552,222

(22) Filed: Aug. 27, 2019

(65) Prior Publication Data

US 2019/0384246 A1   Dec. 19, 2019

Related U.S. Application Data

(63) Continuation of application No. 15/811,184, filed on Nov. 13, 2017, now Pat. No. 10,437,217, which is a continuation of application No. 13/757,363, filed on Feb. 1, 2013, now Pat. No. 9,814,190.

(51) Int. Cl.
| | |
|---|---|
| *B05B 15/62* | (2018.01) |
| *A62C 35/68* | (2006.01) |
| *G05B 19/042* | (2006.01) |
| *B05B 15/656* | (2018.01) |
| *A01G 25/02* | (2006.01) |

(52) U.S. Cl.
CPC .............. *B05B 15/62* (2018.02); *A62C 35/68* (2013.01); *A01G 25/02* (2013.01); *B05B 15/656* (2018.02); *G05B 19/042* (2013.01); *G05B 2219/2625* (2013.01)

(58) Field of Classification Search
CPC ........ A01G 25/02; A62C 35/68; B05B 15/62; B05B 15/656; G05B 19/042; G05B 2219/2625

See application file for complete search history.

(56) References Cited

U.S. PATENT DOCUMENTS

| | | |
|---|---|---|
| 3,250,559 A | 5/1966 | Sommerfield |
| 4,555,744 A | 11/1985 | Maroney et al. |
| 4,595,248 A | 6/1986 | Brown |
| 4,785,376 A * | 11/1988 | Dively ..................... H02B 1/50 137/356 |
| 5,636,104 A | 6/1997 | Oh |

(Continued)

*Primary Examiner* — Kidest Bahta
(74) *Attorney, Agent, or Firm* — Knobbe Martens Olson & Bear, LLP

(57) ABSTRACT

A modular irrigation controller has a robust ground path with high conductivity that can accommodate lightning induced power surges on field valve wires and common wires that are connected to a plurality of station modules. Sensitive electronic components in the station modules are thereby protected from damage. The robust ground path extends from conductors on circuit boards within the station modules through captive mounting screws to a metallic backplane and then through metallic grounding brackets within a pedestal enclosing the modules and the backplane. The grounding brackets are in turn grounded to both an earth ground stake and to a ground wire associated with the incoming one hundred and ten volt AC power.

20 Claims, 28 Drawing Sheets

(56) References Cited

U.S. PATENT DOCUMENTS

| | | | |
|---|---|---|---|
| 5,696,493 A * | 12/1997 | Einck | C02F 3/006 |
| | | | 340/618 |
| 5,831,826 A | 11/1998 | Van Ryswyk | |
| 5,868,316 A | 2/1999 | Scott | |
| 5,979,482 A | 11/1999 | Scott | |
| 5,979,863 A | 11/1999 | Lousberg | |
| 5,996,608 A | 12/1999 | Hunter et al. | |
| 6,158,278 A | 12/2000 | Klinefelter | |
| 6,494,751 B1 | 12/2002 | Morello et al. | |
| 6,570,109 B2 | 5/2003 | Klinefelter et al. | |
| 6,618,234 B1 | 9/2003 | Abdelghani et al. | |
| 6,786,691 B2 | 9/2004 | Honma | |
| 6,842,667 B2 | 1/2005 | Beutler et al. | |
| 6,877,994 B2 | 4/2005 | Huang | |
| 6,977,351 B1 | 12/2005 | Woytowitz | |
| 7,069,115 B1 | 6/2006 | Woytowitz | |
| 7,011,551 B2 | 9/2006 | Johansen et al. | |
| 7,225,058 B1 | 5/2007 | Woytowitz et al. | |
| 7,243,005 B1 | 7/2007 | Beutler et al. | |
| 7,289,886 B1 | 10/2007 | Woytowitz | |
| D580,373 S | 11/2008 | Stange et al. | |
| 7,457,687 B1 | 11/2008 | Porter | |
| 7,503,346 B1 | 3/2009 | Clark | |
| 7,613,547 B1 | 11/2009 | Woytowitz | |
| D607,759 S | 1/2010 | Woytowitz et al. | |
| D607,847 S | 1/2010 | Elliott et al. | |
| 7,665,713 B1 | 2/2010 | Clark | |
| D612,813 S | 3/2010 | Paul | |
| D613,255 S | 4/2010 | Paul | |
| 7,772,726 B1 | 8/2010 | Porter et al. | |
| 7,806,382 B1 | 10/2010 | Palumbo et al. | |
| 7,891,370 B1 | 2/2011 | Stange | |
| 7,899,581 B1 | 3/2011 | Woytowitz | |
| D638,914 S | 5/2011 | Schmuckle | |
| D643,093 S | 8/2011 | Schmuckle et al. | |
| D653,219 S | 1/2012 | Woytowitz et al. | |
| D668,231 S | 10/2012 | Paul et al. | |
| 8,297,314 B2 | 10/2012 | Clark et al. | |
| 9,151,454 B1 | 10/2015 | Lindblad et al. | |
| 2003/0209356 A1 * | 11/2003 | Schenk | H02G 9/10 |
| | | | 174/50 |
| 2004/0107972 A1 | 6/2004 | Sheen | |
| 2004/0201972 A1 | 10/2004 | Walsea | |
| 2005/0055106 A1 | 3/2005 | Beutler et al. | |
| 2008/0025813 A1 | 1/2008 | Wu et al. | |
| 2010/0030476 A1 | 2/2010 | Woytowitz et al. | |
| 2011/0297757 A1 | 12/2011 | Schmuckle | |
| 2012/0181402 A1 | 7/2012 | Putz et al. | |
| 2012/0274219 A1 | 11/2012 | Woytowitz et al. | |
| 2013/0021721 A1 * | 1/2013 | Borden | H02B 1/50 |
| | | | 361/622 |
| 2013/0094227 A1 | 4/2013 | Scordino | |
| 2014/0026888 A1 | 1/2014 | Malula | |
| 2014/0268834 A1 | 9/2014 | Zanotto | |

* cited by examiner

IRRIGATION CONTROLLER WITH ROBUST GROUND PATH

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

FIELD OF THE INVENTION

The present application relates to electronic irrigation controllers used to water turf and landscaping.

BACKGROUND OF THE INVENTION

Irrigations systems usually include a programmable irrigation controller that turns valves ON and OFF in accordance with a watering program. The irrigation controller is typically connected to a plurality of solenoid actuated valves through field valve wires and valve common wires. Some irrigation controllers known as "decoder controllers" control a large number of valves through a single set of wires that run between all of the valves by encoding unique valve identity codes on the wires along with the power signal. Large irrigation systems installed at golf courses and parks sometimes include miles of wires buried under ground near the surface. This presents a significant challenge in terms of protecting the sensitive electronic components of the irrigation controller from power surges, because lightning strikes are attracted to the areas where the wires are buried.

SUMMARY OF THE INVENTION

In accordance with one aspect of the present invention, an irrigation controller includes a housing and a control panel mounted in the housing. The irrigation controller further includes a processor and at least one manually actuable control on the control panel that is operatively connected to the processor. A memory is operatively connected to the processor and stores programming that enables the processor to execute a watering program selected by a user through the manually actuable control. The irrigation controller further includes a metallic backplane mounted in the housing. A plurality of modules are removably mountable on the backplane. At least one of the modules includes a plurality of drive circuits controllable by the processor for generating a plurality of valve control signals in accordance with the watering program. At least one electrically conductive captive mounting screw is configured to secure the module having the drive circuits to the backplane and establish a ground path from a least one conductor on a circuit board within the module through the backplane. The irrigation controller further includes a plurality of terminals operatively connected to the drive circuits for connecting wires on which the valve control signals from the drive circuit can be transmitted to corresponding valves installed on an irrigation site. A plurality of connectors are included in the irrigation controller for establishing an operative connection between each module and the processor when the modules are mounted on the backplane.

In accordance with another aspect of the present invention, a module is configured for mounting on an electrically conductive backplane of an irrigation controller to provide a robust ground path. The module includes a circuit board and a plurality of drive circuits mounted on the circuit board. The drive circuits are controllable by a processor of the irrigation controller for generating a plurality of valve control signals in accordance with a watering program. A cover encloses the circuit board. A plurality of terminals are operatively connected to the drive circuits for connecting wires on which the valve control signals can be transmitted to corresponding valves installed on an irrigation site. A plurality of connectors establishes an operative connection between the drive circuits and the processor when the cover is mounted on the backplane. At least one electrically conductive mounting screw is mounted in the cover and is configured to secure the module to the backplane and establish a ground path from a least one conductor on the circuit board through the backplane.

DETAILED DESCRIPTION

Protecting the sensitive electronic components of an irrigation controller from lightning induced power surges requires adequate grounding in the irrigation controller. Adequate grounding is also important for proper operation of the irrigation controller aside from accommodating power surges.

In one embodiment, the present invention is exemplified by unique module attachment architecture in a modular electronic irrigation controller. The irrigation controller has a robust ground path, i.e. one with high conductivity that can accommodate lightning induced power surges on field valve wires and common wires that are connected to a plurality of station modules. Sensitive electronic components in the station modules are thereby protected from damage. The robust ground path extends from conductors on circuit boards within the station modules through captive mounting screws to a metallic backplane and then through metallic grounding brackets within a pedestal enclosing the modules and the backplane. The grounding brackets are in turn grounded to both an earth ground stake and to a ground wire associated with the incoming wires that provide line voltage AC power.

Figure 1:
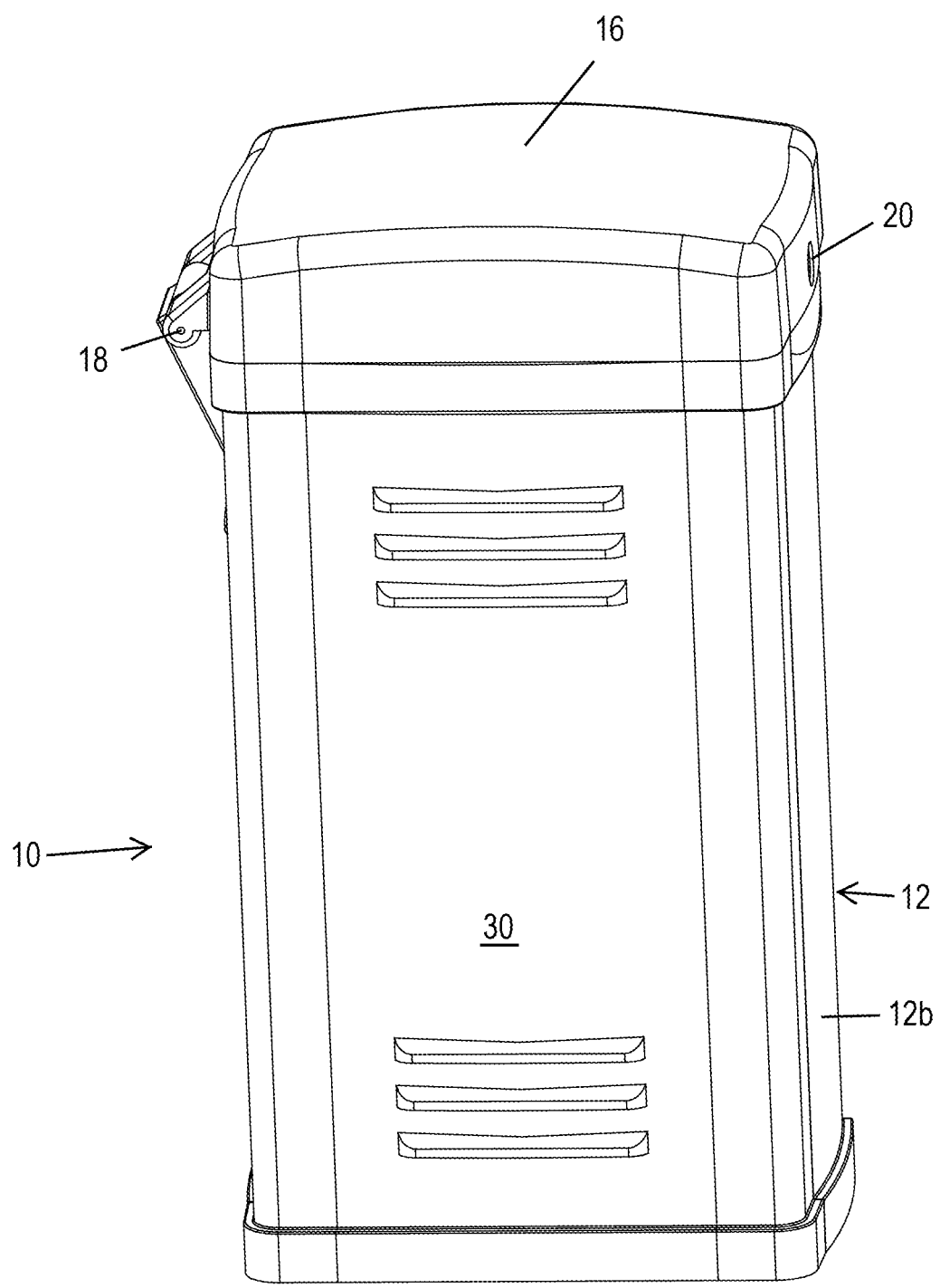
FIG. 1 is an isometric view of a pedestal style modular irrigation controller in accordance with a first embodiment of the present invention.

Referring to FIG. 1, in accordance with a first embodiment of the present invention, an irrigation controller 10 includes a rectangular outer protective housing in the form of a pedestal 12 and a control panel in the form of a face pack 14 (FIG. 2) mounted in an upper portion of the pedestal 12. The pedestal 12 is preferably made of roto-molded plastic parts that are formed to provide an integral water management system for draining away water as described in detail later herein. A top cover 16 (FIG. 1) of the pedestal 12 is mounted on a hinge assembly 18 and can be manually swung closed to seal and protect the face pack 14. The top cover 16 can be secured in its closed position by actuating a key lock 20 mounted on the top cover 16 with a key (not illustrated).

Figure 2A:
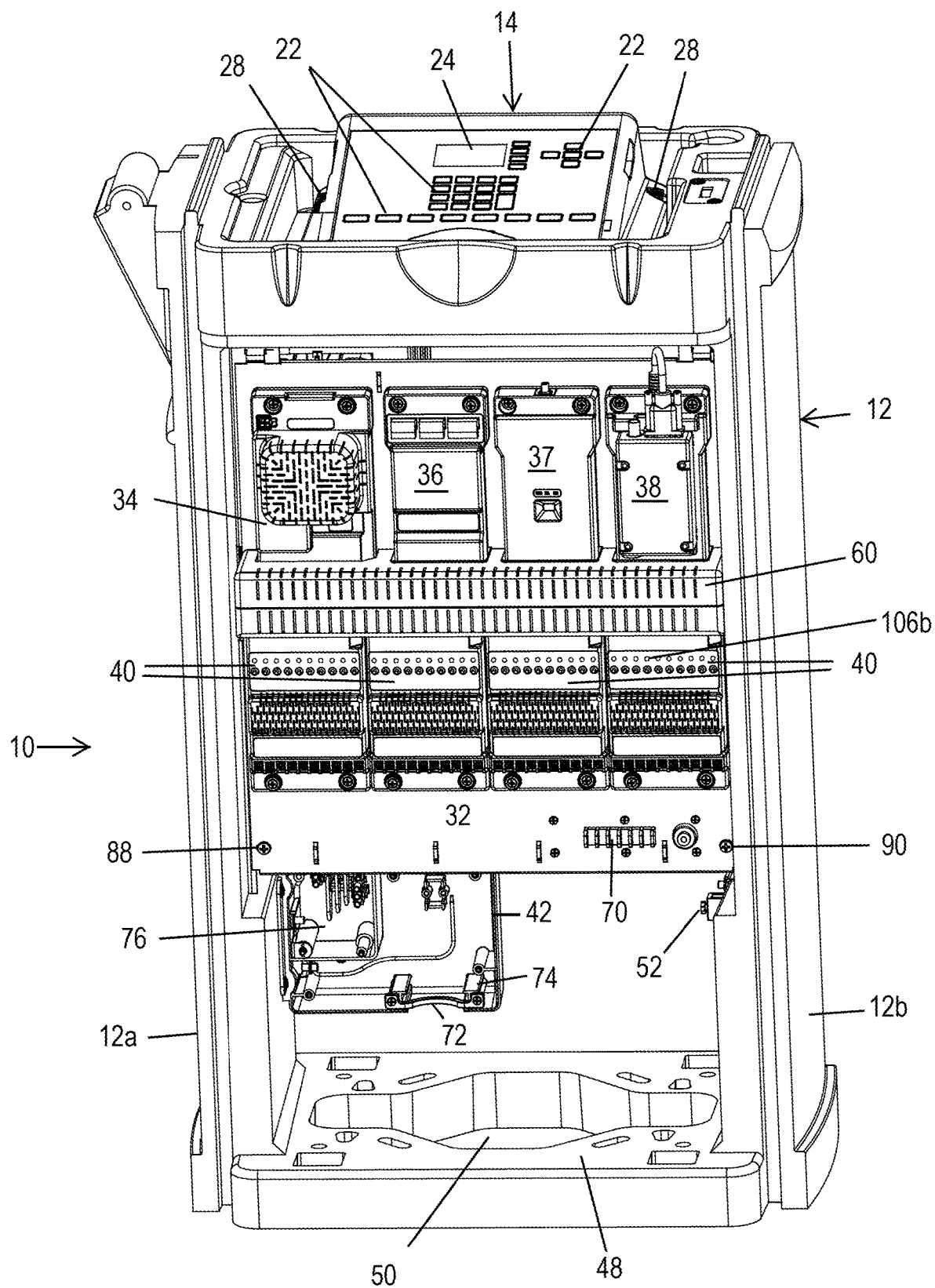
FIG. 2A is an enlarged isometric view of the irrigation controller of FIG. 1 with its top cover and louvered front door removed to reveal its face pack and removable modules.

The face pack 14 (FIG. 2A) has manually actuable controls that enable a user to enter and/or select a watering schedule, including a plurality of push button switches 22. The face pack 14 also has a liquid crystal display (LCD) 24 that shows a graphical user interface (GUI). The face pack 14 is mounted in an upwardly opening rectangular receptacle 26 (FIG. 2B) formed in the upper portion of the pedestal 12. The face pack 14 is secured to a frame of the pedestal 12 by screws 28 (FIG. 2A). After the top cover 16 has been swung to its open position, a louvered front door 30 (FIGS. 1 and 29A-29D) of the pedestal 12 can be removed as illustrated in FIG. 2A. This allows maintenance personnel to gain access to a plurality of generally rectangular modules removably mounted on a front metallic backplane 32 vertically mounted within the hollow interior of the pedestal 12. The pedestal 12 has a rear door (not illustrated) identical to the front door 30. The rear door can be removed to allow access to the rear side of the interior of the pedestal 12 after the top cover 16 has been swung to its open position.

Figure 6:
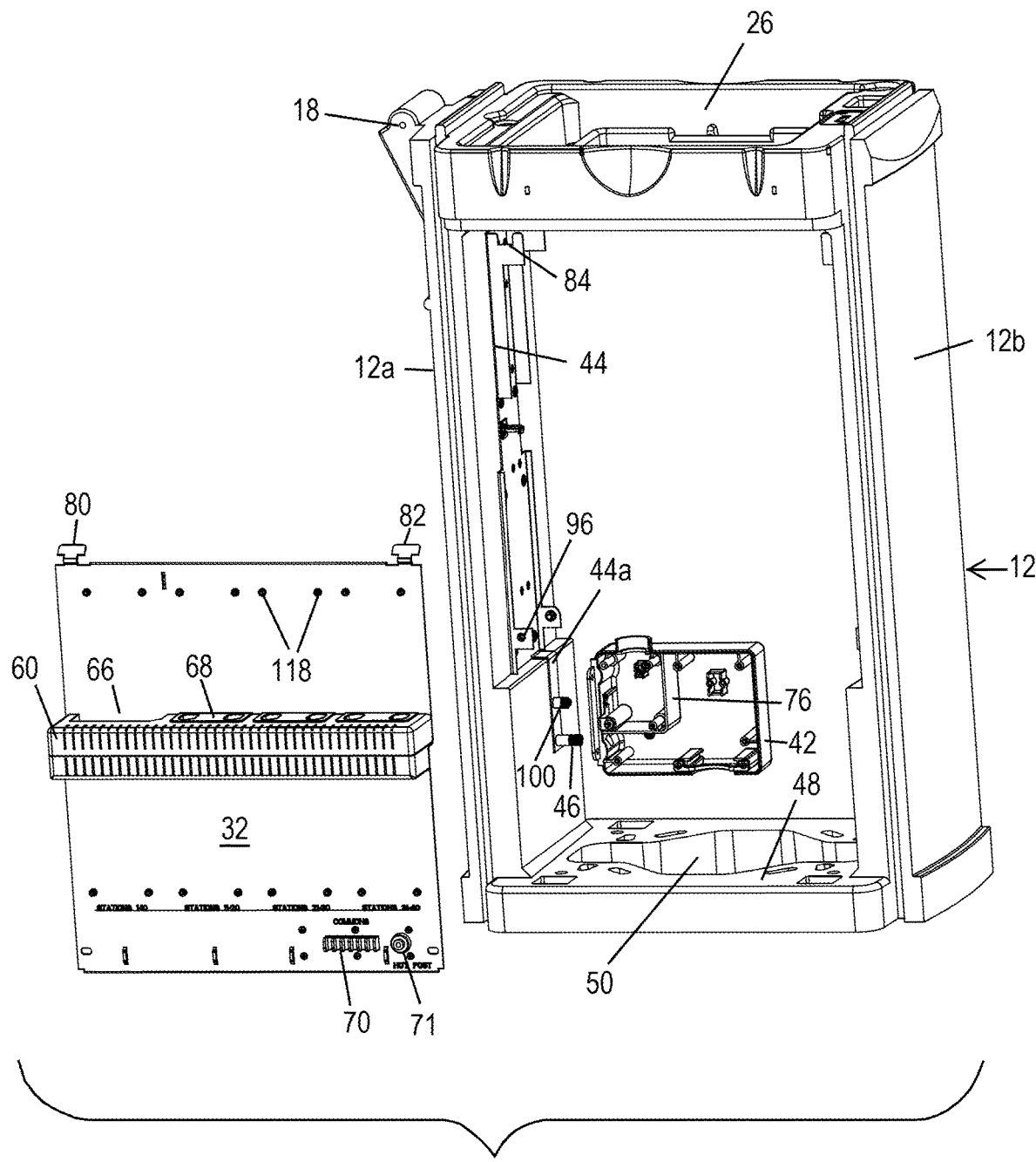
FIG. 6 illustrates the left grounding bracket within the pedestal of the irrigation controller of FIG. 1 and the unpopulated backplane ready for installation within the pedestal.
Figure 7:
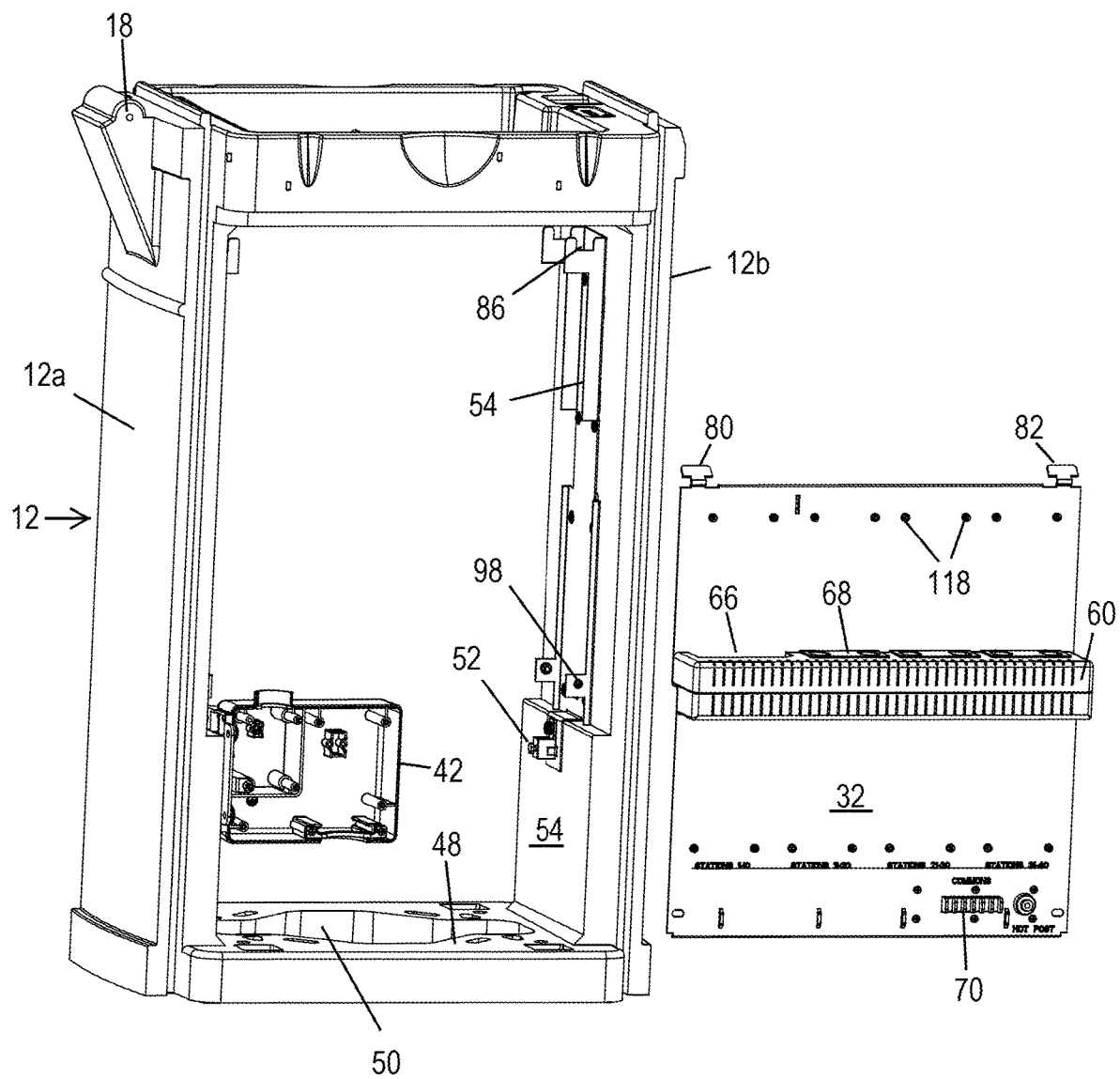
FIG. 7 illustrates the right grounding bracket within the pedestal of the irrigation controller of FIG. 1 and the unpopulated backplane ready for installation within the pedestal.

The removable modules of the irrigation controller 10 include a power module 34 (FIG. 4), a four wire (hard wire) communications module 36, a low power free wave radio module 37 (no license required), a high power radio communications module 38 (license required), and four output or station modules 40. The irrigation controller as illustrated in FIG. 2A is configured as a so-called modular irrigation controller in which the station modules 40 each control ten zones on the irrigation site by sending valve control signals to each valve via individual dedicated field valve wires. An incoming power connection box 42 (FIG. 2A) is mounted within the lower portion of the hollow interior of the pedestal 12 and provides a location to route power wires (not illustrated) that are connected to an outside line voltage AC power source (not illustrated). The power wires include a ground wire that is connected to a left metallic grounding bracket 44 (FIG. 6) by a securing the ground wire to a lug 46 (FIG. 6) attached to an extension strap portion 44a of the left grounding bracket 44. A generally rectangular base 48 (FIG. 2A) of the frame of the pedestal 12 is formed with a large elongated access hole 50 for routing a plurality of power, ground, field valve, and valve common wires into the hollow interior of the pedestal 12. These wires are buried in the ground and their proximal or inner ends emerge directly beneath the pedestal 12 where they enter its hollow interior. A screw terminal 52 (FIG. 7) is mounted to a right metallic grounding bracket 54. The screw terminal 52 is used to connect one end of an earth ground wire (not illustrated), the other end of which is connected to a ground stake (not illustrated).

The face pack 12 and the station modules 40 provide the electronic circuitry that sends twenty-four volt AC valve control signals to turn solenoid actuated valves, or valve-in-head sprinklers (not illustrated), mounted around a large irrigated area such as a large park or a golf course, ON and OFF in accordance with a watering program. The overall electronic architecture of the irrigation controller 10 is illustrated in the simplified block diagram of FIG. 3. Disclosure regarding exemplary electronic circuitry including a main processor P, a memory M and drive circuits within the station modules 40, as well as programming for the irrigation controller 10, may be found in U.S. Patent Application Pub. No. US 2010/0030476 A1 of Peter J. Woytowitz et al. published Feb. 4, 2010 and entitled "Irrigation System with ET Based Seasonal Watering Adjustment," the entire disclosure of which is hereby incorporated by reference. Said application is assigned to Hunter Industries, Inc., the assignee of the subject application. An example of a suitable valve-in-head sprinkler (designated V in FIG. 3) that can be controlled by the irrigation controller 10 and that is designed for irrigating golf courses is disclosed in U.S. patent application Ser. No. 13/680,326 of Richard M. Dunn et al. filed Nov. 19, 2012 and entitled "Valve-in-Head Sprinkler with Service Valve," also assigned to Hunter Industries, Inc. In FIG. 3 the valve common wires are designated C. All of the valve common wires are connected to a terminal block 70 (FIG. 2B) that is mounted on the front backplane 32.

Figure 9A:
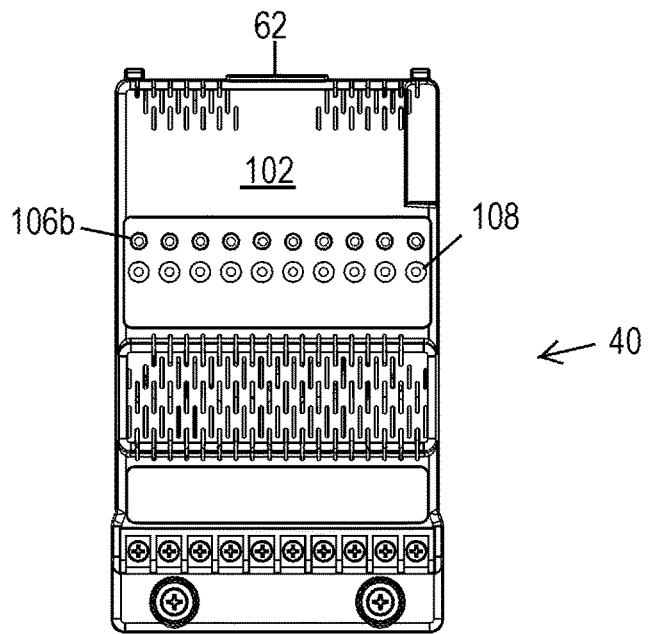
FIGS. 9A, 9B and 9C are reduced front plan elevation, bottom end, and rear plan elevation views, respectively, of the station module of FIG. 8.

The irrigation controller 10 includes plurality of electrical connectors for establishing an operative connection between each of the modules 34, 36, 37, 38 and 40 and the main processor P within the face pack 14 when the modules are mounted on the backplane 32. Each of the modules has ten conductive pins 56 (FIG. 10B) that can be plugged into mating female electrical connectors 58 mounted to a printed circuit board (PCB) 59 which is electrically coupled to the face pack 14 via a communications cable (not illustrated). The PCB 59 is housed within a louvered module connection housing 60 (FIG. 4) mounted on the backplane 32 between the mounting locations of the upper modules 34, 36, 37 and 38 and the mounting locations of lower modules 40. The pins 56 extend from a connector assembly 62 (FIGS. 9A, 10B and 10C) mounted to a PCB 64 housed within each of the modules. The pins 56 are electrically connected to conductors in the form of conductive traces formed on the PCB 64. Various other forms of electrical connectors can be used besides a multi-pin connection scheme such as card edge connectors or wire harnesses with mating off-board electrical connectors. The connectors that operatively connect some of the modules with the main processor P could also be optical connectors where only data and/or command, and not power, signals are being transmitted. Other circuit assemblies can be used to support the electronic components of the station module besides a conventional PCB made of a laminate of fiberglass composite material with a layer of Copper sheet etched to provide the required connections. One example is a circuit board molded of polyimide with the conductors applied via a plating bath.

Figure 2B:
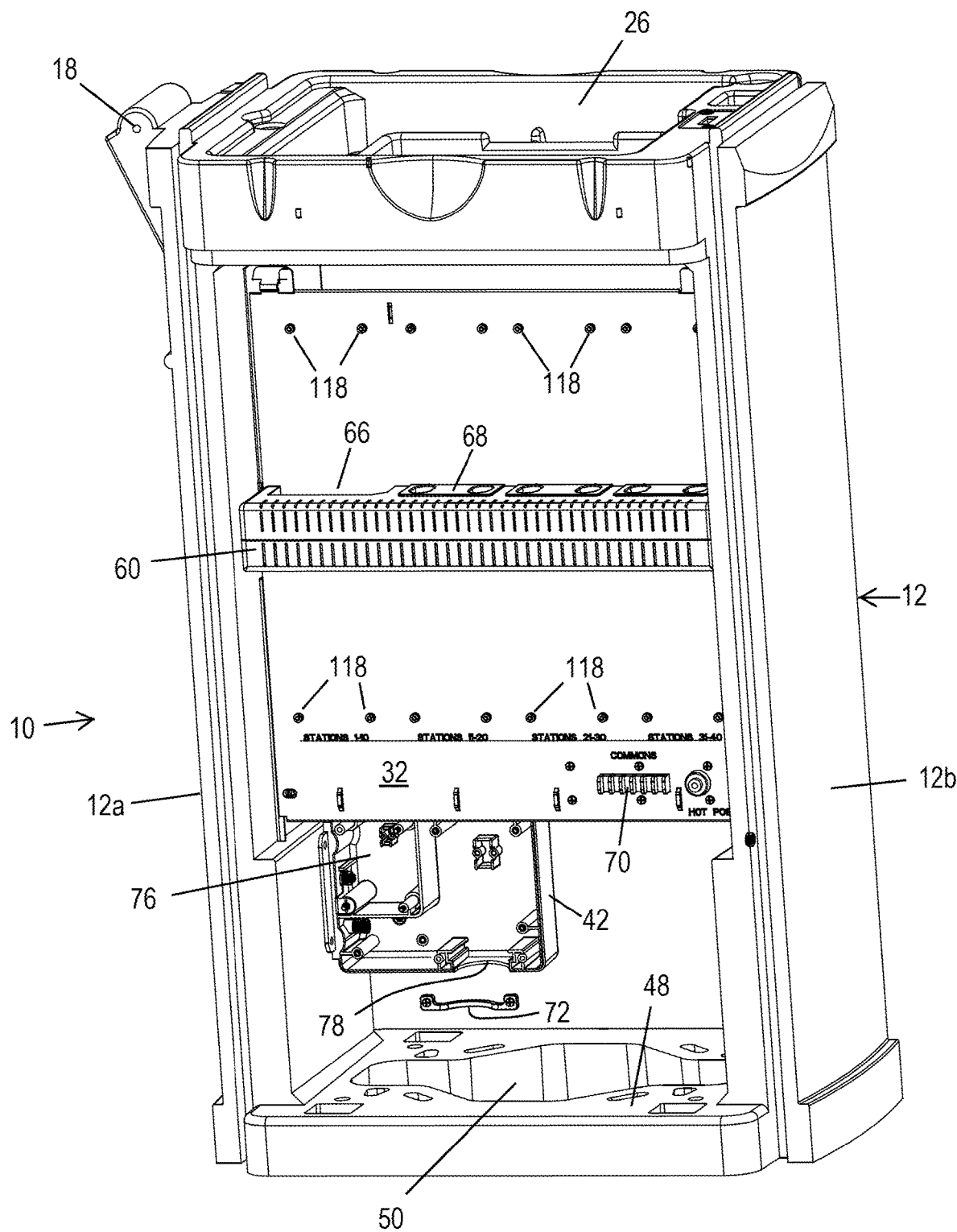
FIG. 2B is a view of the irrigation controller of FIG. 1 similar to FIG. 2, with its face pack and modules removed.
Figure 3:
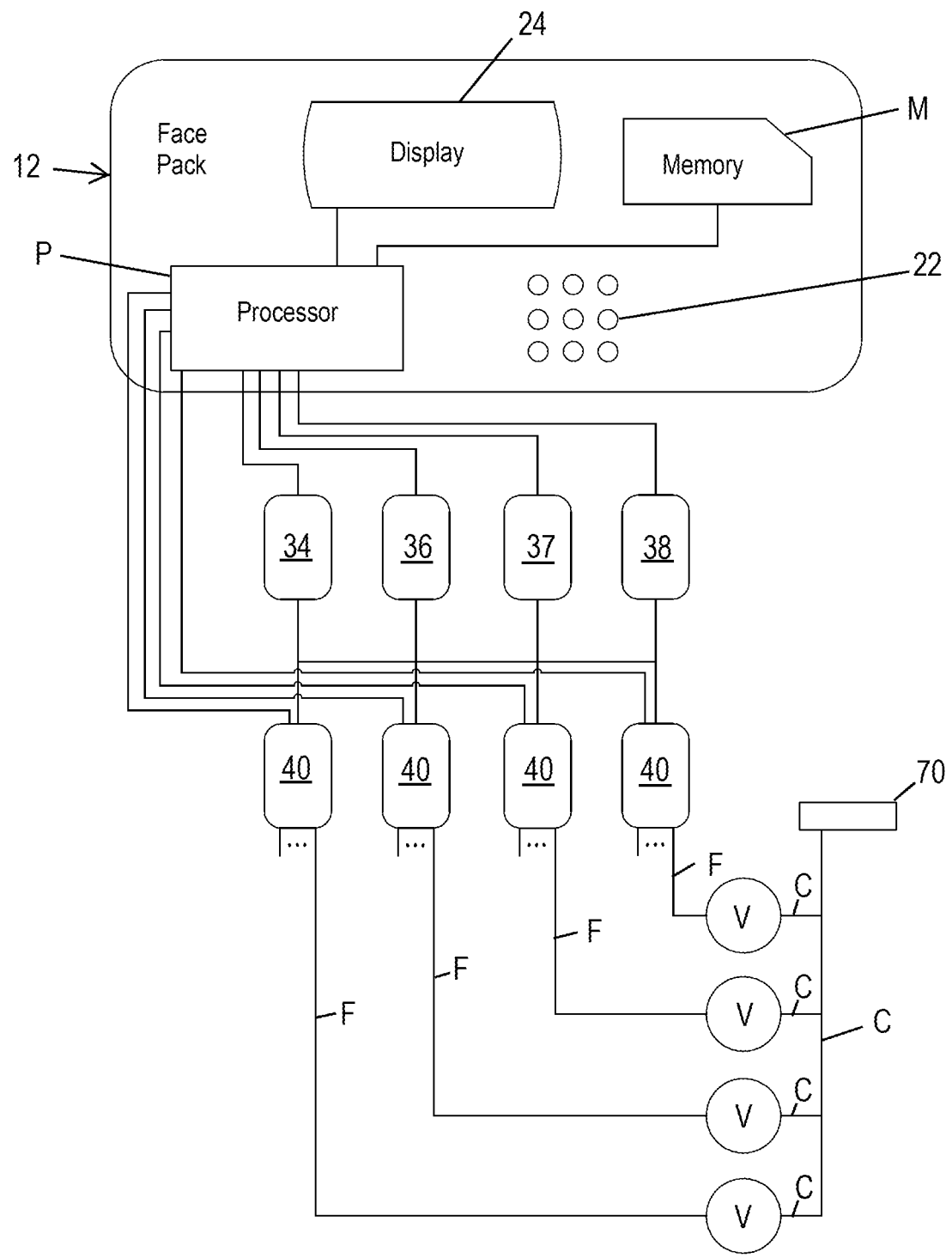
FIG. 3 is a simplified block diagram of the electronics of the irrigation controller of FIG. 1.
Figure 25:
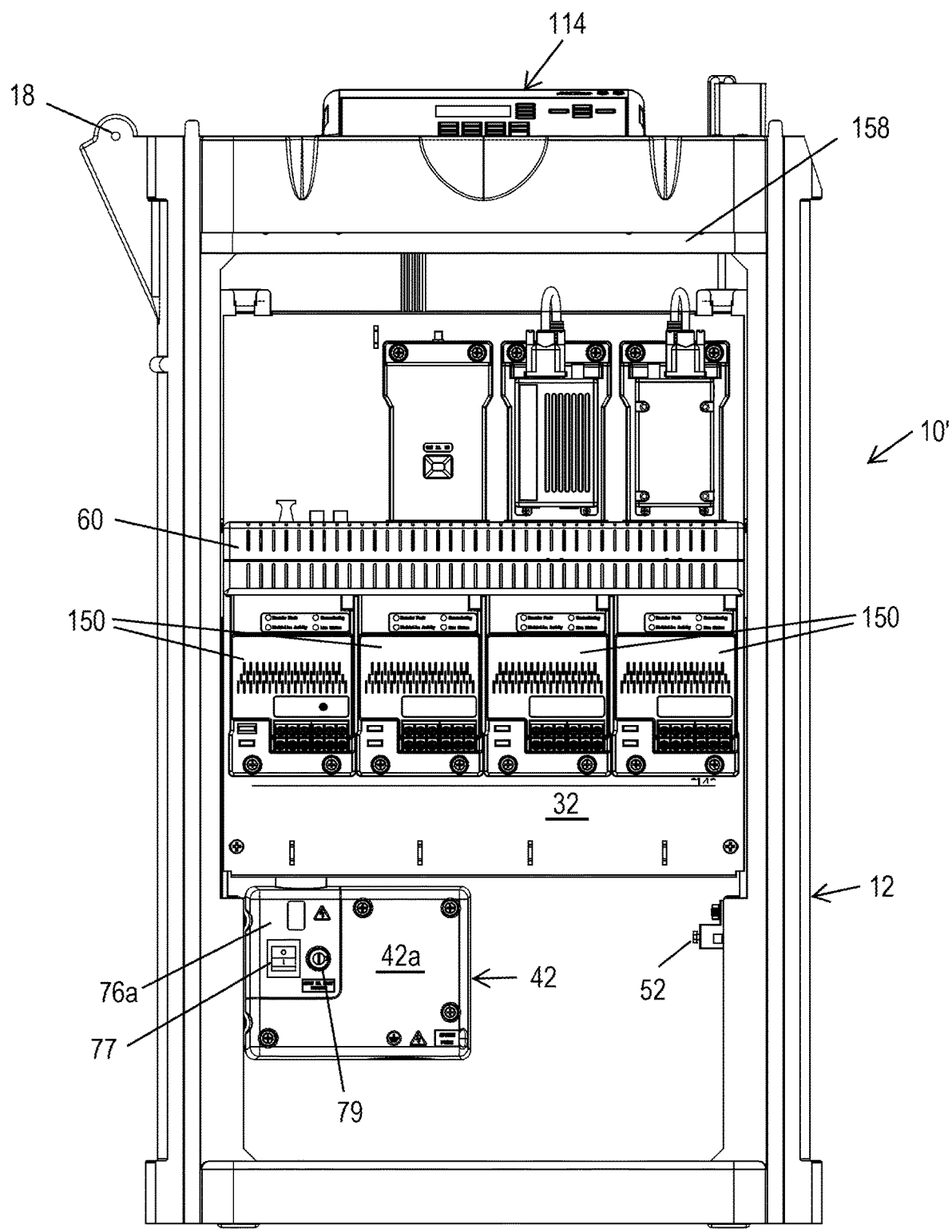
FIG. 25 is an enlarged front elevation view of an alternate embodiment of the irrigation controller similar to that illustrated in FIG. 1 except that it has been configured as a decoder controller. The front door of the irrigation controller has been removed to show a plurality of encoder modules installed on the front backplane instead of the station modules illustrated in FIG. 2A.

Referring to FIG. 2B, the module connection housing 60 has a plurality of receptacles or bays 66 that allow the end of each module to be inserted into the same and the pins 56 plugged into their mating female electrical connectors 58. When a bay is not in use, a protective cover 68 is inserted into the same to conceal the female electrical connectors 58. The terminal block 70 is mounted on the backplane 32 for electrically connecting the plurality of valve common wires C (FIG. 3). An arcuate plastic retainer 72 (FIG. 2B) may be secured with a pair of screws to mounting bars 74 of the power connection box 42 with its curved section projecting inwardly as illustrated in FIG. 2A. During installation of the irrigation controller 10 a contractor can remove the retainer 72, and feed the power wires through an arcuate recess 78 (FIG. 2B) in a bottom wall of the power connection box 42. The retainer 72 may then be reattached to the mounting bars 74 to retain the wires in position. If the incoming wiring requires more space, the retainer 72 can alternatively be reattached with its curved section projecting outwardly and still retain the wires in position. The power connection box 42 includes a smaller inner mounting box 76 which houses a power switch 77 and a fuse 79 (FIG. 25). A rectangular cover 76a is secured over the mounting box 76 with screws. An L-shaped cover 42a is secured with screws over the remainder of the otherwise open area of the power connection box 42. The cover 42a shields maintenance personnel from the power wire connections.

Figure 4:
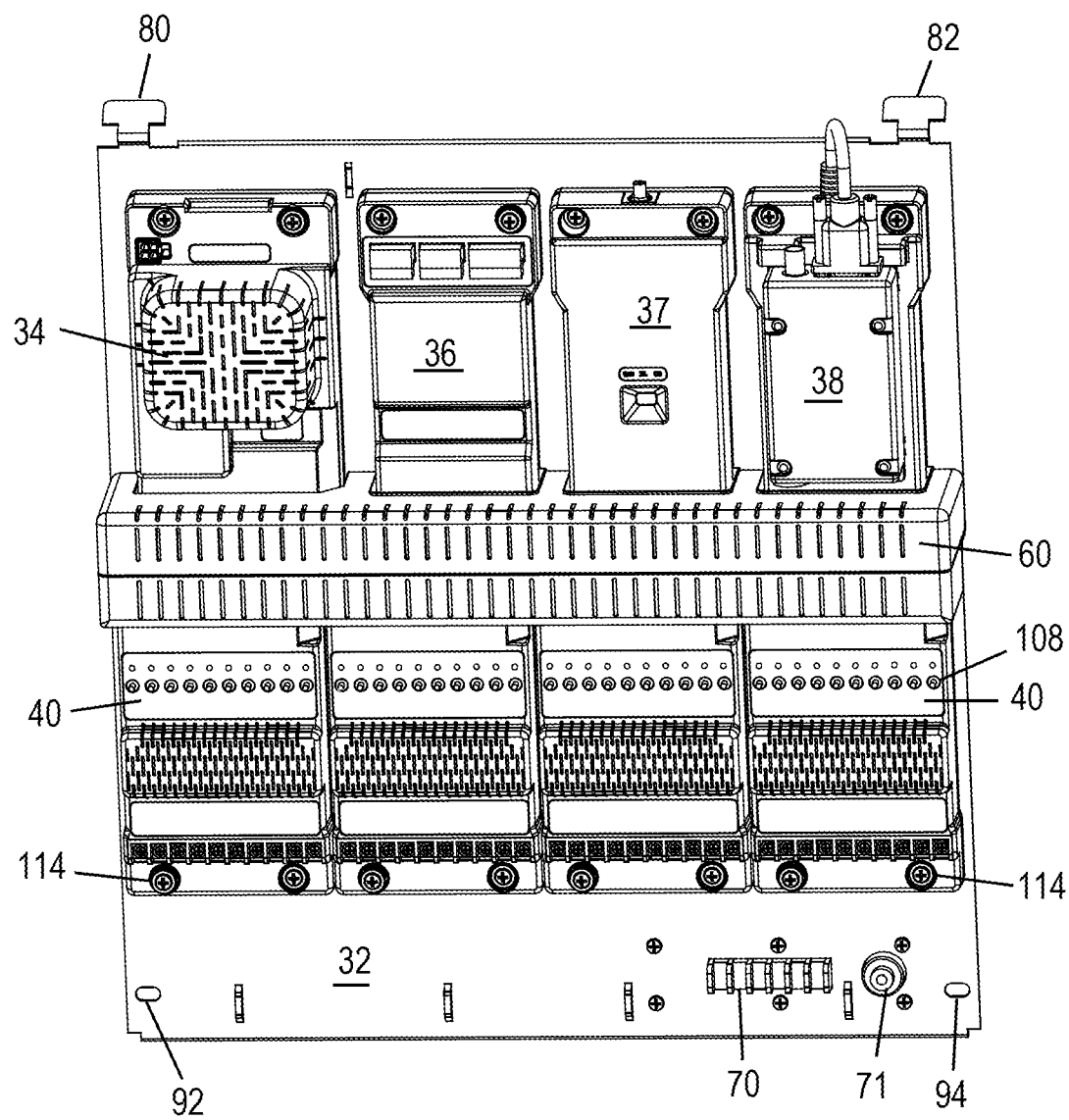
FIG. 4 is an enlarged isometric view of the backplane of the irrigation controller of FIG. 1 with its modules mounted thereon.
Figure 5:
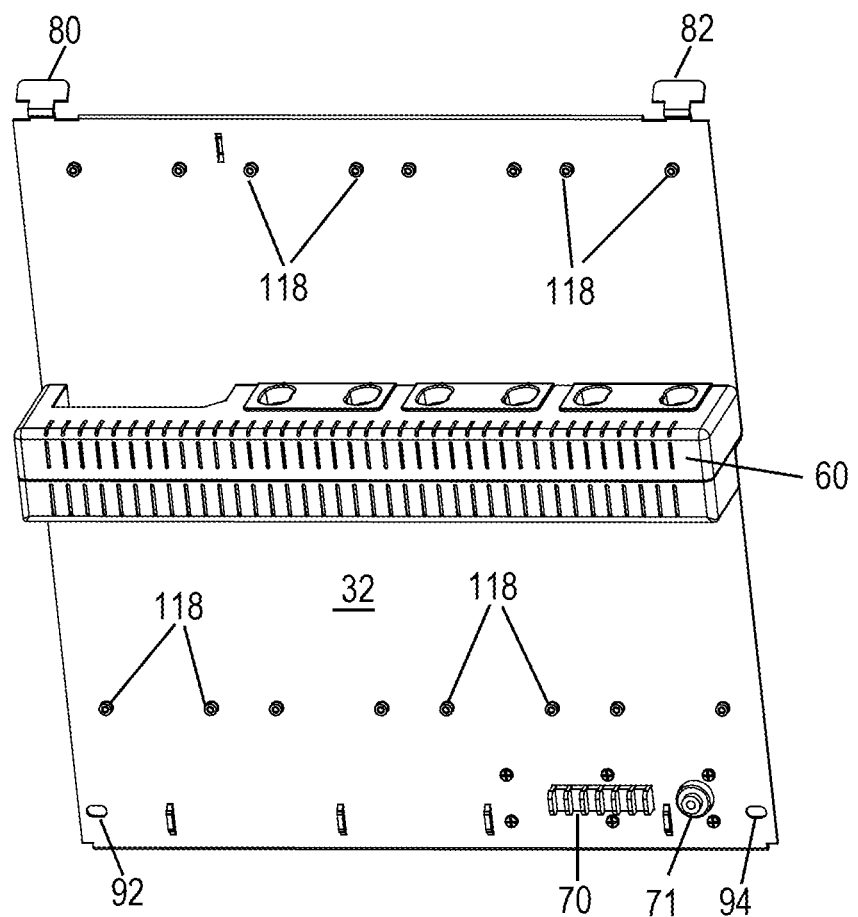
FIG. 5 is an enlarged isometric view of the backplane of the irrigation controller of FIG. 1 with the modules removed.

Referring to FIG. 5, the front metallic backplane 32 comprises a generally square planar section of suitable Aluminum alloy with an electrically conductive chromate conversion coating to inhibit corrosion. The backplane 32 can be made of other electrically conductive metals such as steel, Copper and brass. The backplane 32 is stamped and bent to form a pair of T-shaped attachment tabs 80 and 82 that hook into corresponding U-shaped slotted portions 84 and 86 (FIGS. 6 and 7) formed at the upper ends of the left grounding bracket 44 and right grounding bracket 54, respectively. A pair of metal screws 88 and 90 (FIG. 2A) extend through oval holes 92 and 94 (FIG. 4) in the lower corners of the backplane 32 and screwed into nuts 96 and 98 (FIGS. 6 and 7) that are securely attached to the left grounding bracket 44 and the right grounding bracket 54, respectively. This attachment secures the backplane 32 to the grounding brackets 44 and 54. The threaded ground connection lug 46 and another threaded lug 100 (FIG. 6) that extend from the extension strap portion 44a of the left grounding bracket 44 are received through aligned holes in a side wall of the power connection box 42. Nuts (not illustrated) are screwed over the lugs 46 and 100 to hold the power connection box 42 in position. The robust ground path of the irrigation controller 10 is thus partially formed by the front backplane 32, the mounting screws 88 and 90, the conductive area where the backplane 32 contacts the brackets 44 and 54 around the mounting screws 88 and 90, the attachment tabs 80 and 82, the slotted portions 84 and 86, and the left and right grounding brackets 44 and 54 which are attached to both the ground wire of the power wires via the lug 46 and the earth ground stake connected via the screw terminal 52.

Figure 8:
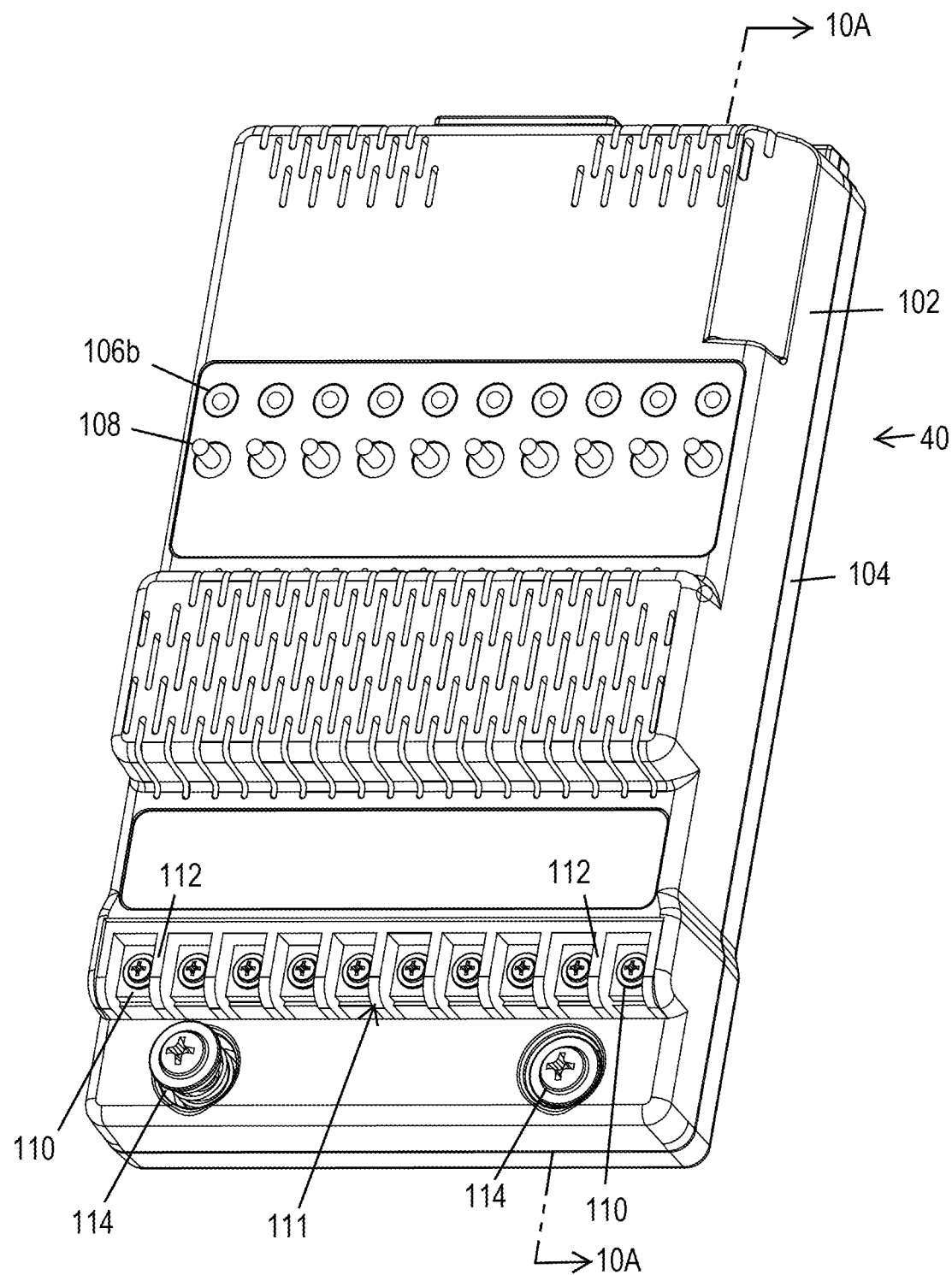
FIG. 8 is a greatly enlarged isometric view of one of the station modules of the irrigation controller of FIG. 1.
Figure 9B:
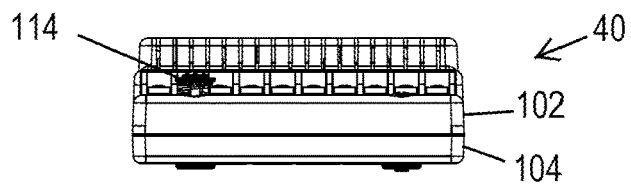
Figure 9C:
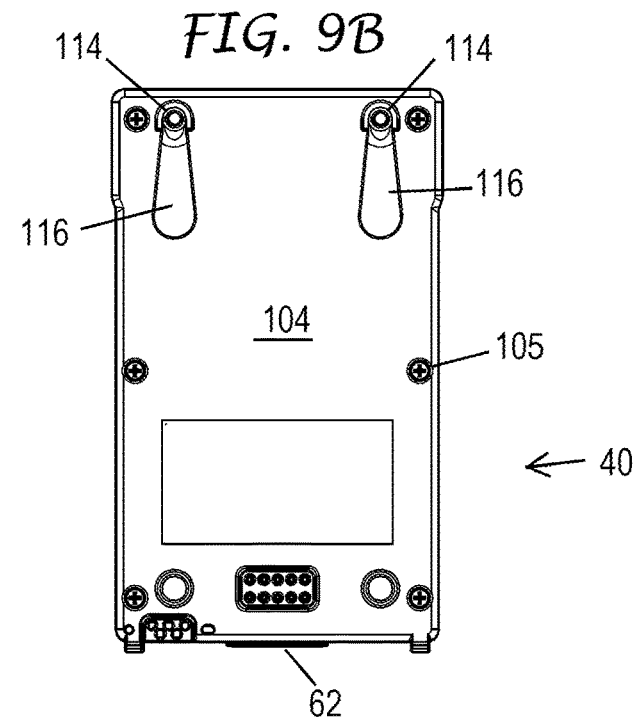
Figure 10A:
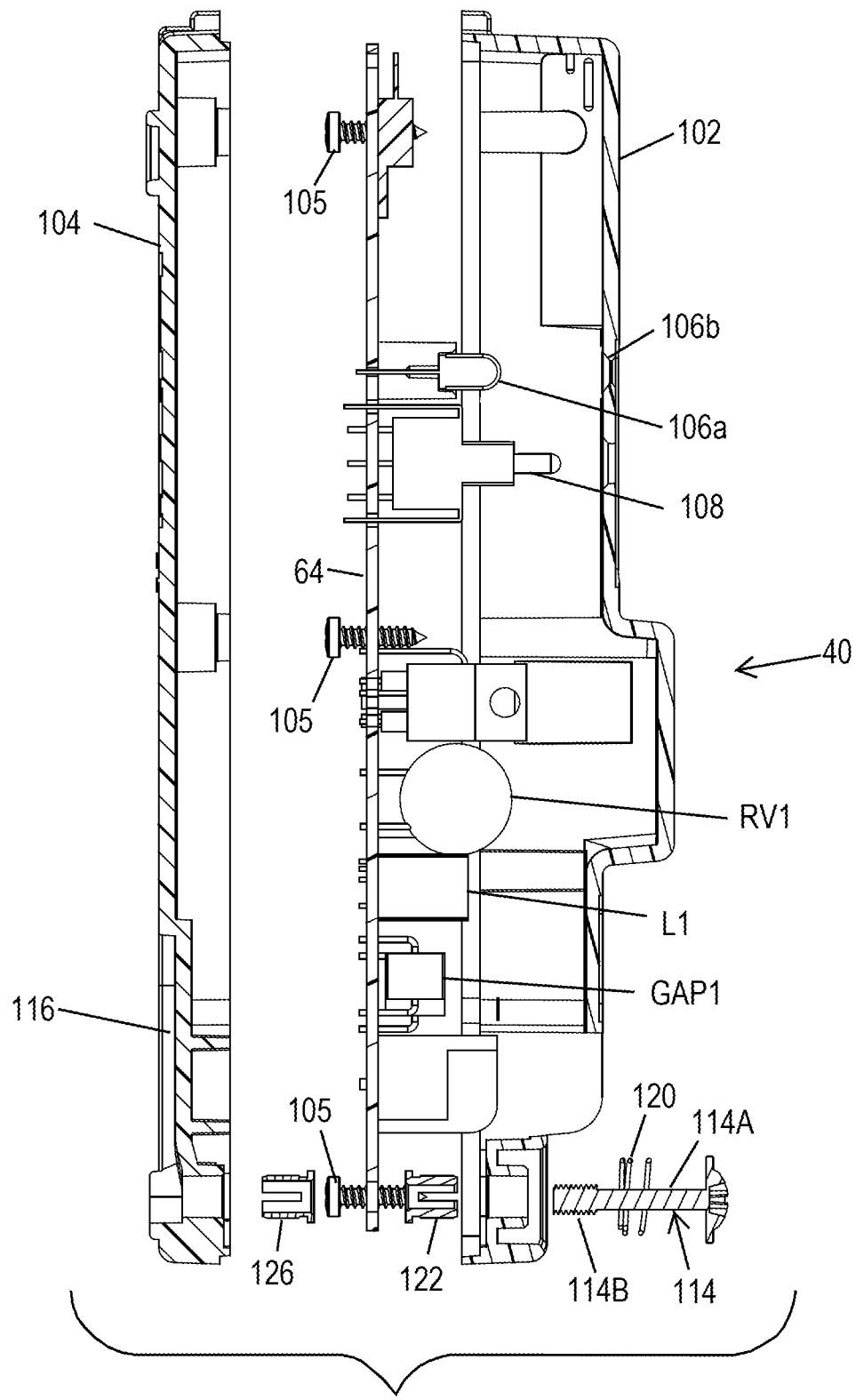
FIG. 10A is an enlarged exploded vertical sectional view of the station module taken along line 10A-10A of FIG. 8.
Figure 10B:
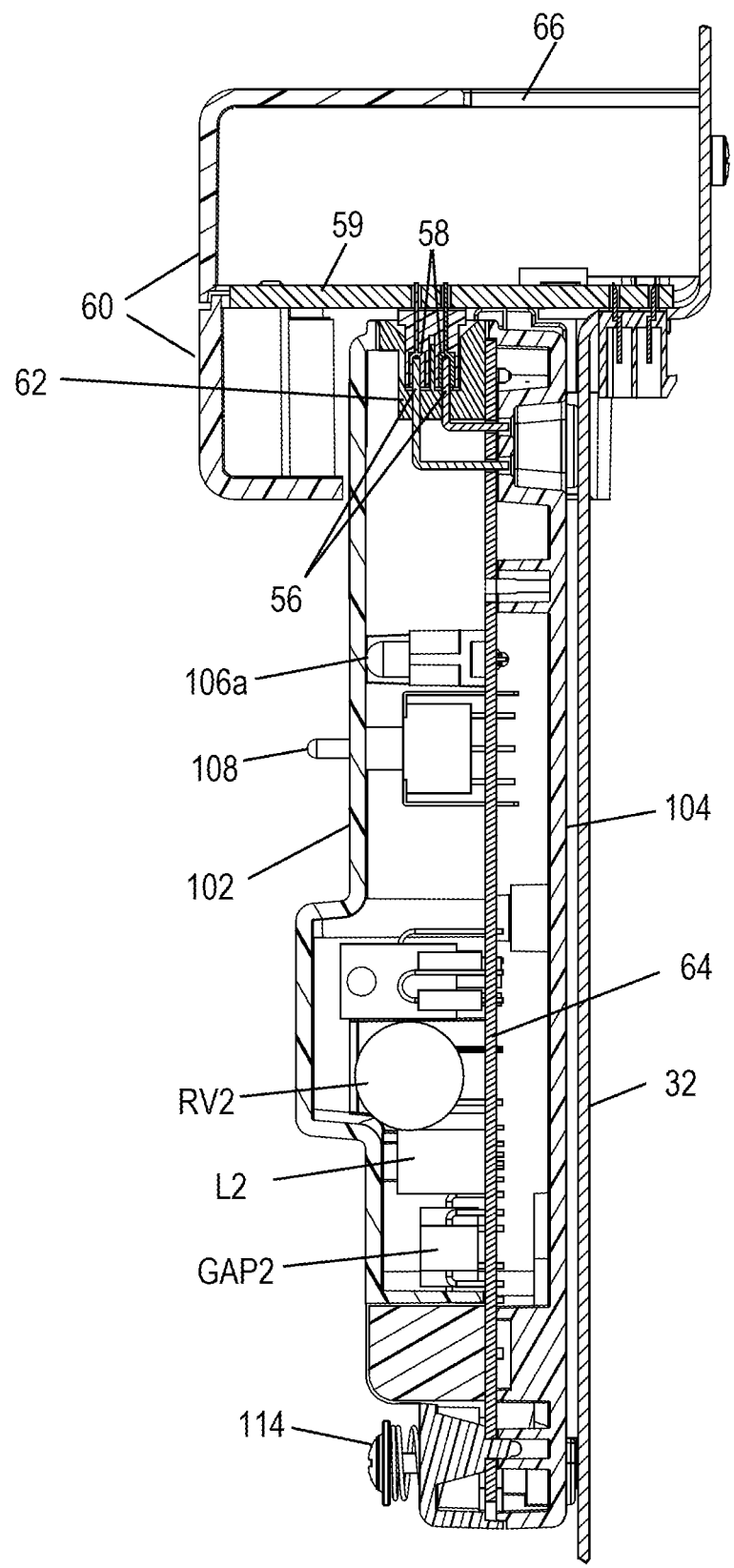
FIG. 10B is an enlarged sectional view taken along line 10B-10B of FIG. 14 illustrating a pair of electrical connection pins of one of the station modules plugged into a corresponding female electrical connector mounted inside the module connection housing.

Referring to FIGS. 8-9C each station module 40 has an identical construction. The station module 40 includes the PCB 64 (FIG. 10A). The PCB 64 is enclosed within, and supported by, a generally rectangular plastic molded top cover 102 that mates with a generally rectangular plastic molded bottom cover 104. The bottom cover 104 is removably secured to the top cover with a plurality of machine screws 105 (FIGS. 9C and 10A) that pass through suitably configured apertures in the bottom cover 104 and are screwed into female threaded bosses (not illustrated) formed in the top cover 102. The upper half of the PCB 64 supports the operational components 113 (FIG. 10D) including the drive circuits for turning ten solenoid actuated valves or valve-in-head sprinklers V ON and OFF. Each sprinkler waters a zone or area of the irrigation site. In the irrigation industry the zones are often assigned numbers and are commonly referred to as stations for purposes of setting up or altering the appropriate watering program stored in the memory M of the irrigation controller 10. The lower half of the PCB 64 supports isolation circuits described hereafter in greater detail in conjunction with FIGS. 10C and 10D.

Figure 10C:
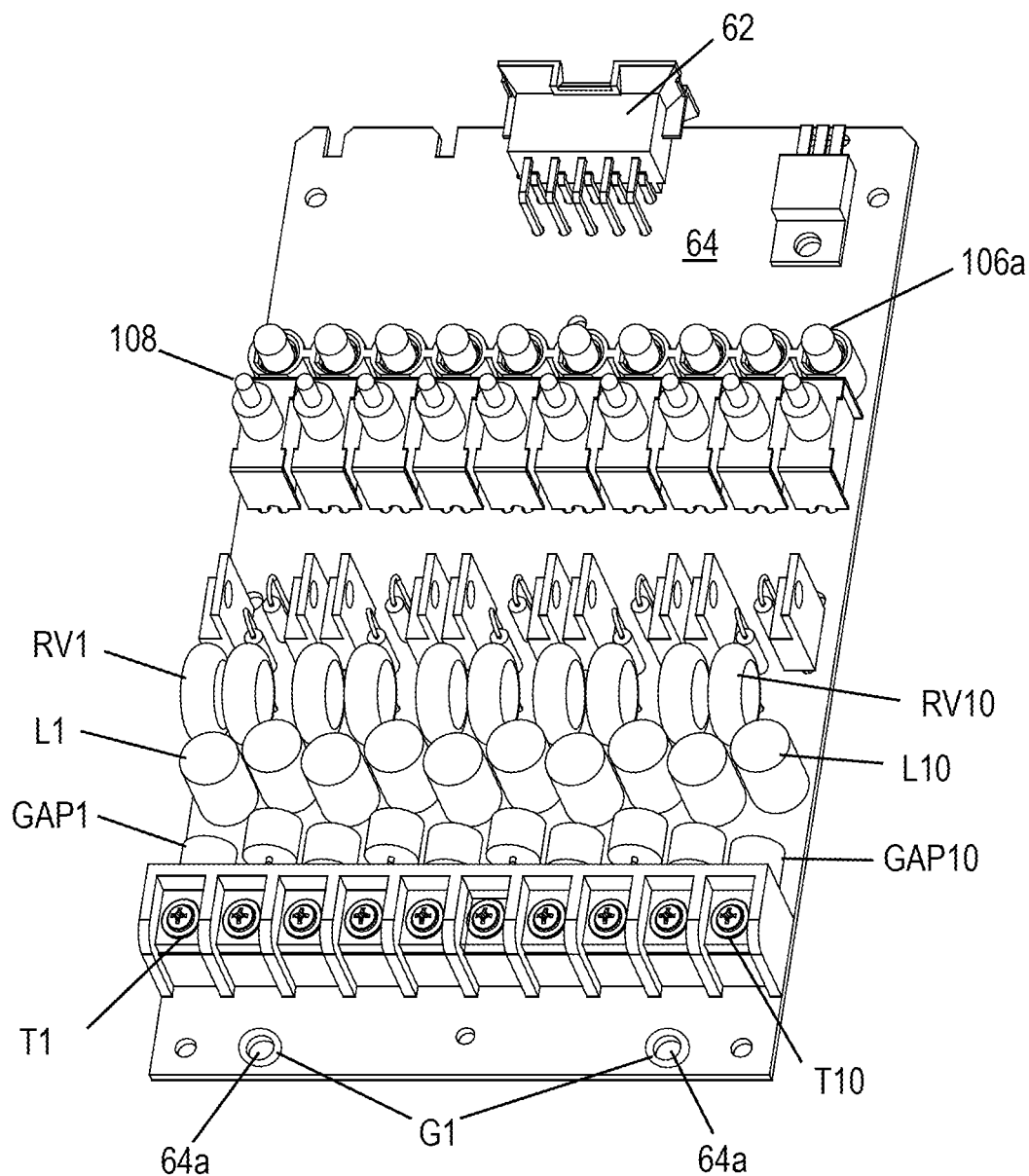
FIG. 10C is an enlarged frontal isometric view of the printed circuit board (PCB) of the station module of FIG. 8 illustrating the electronic components mounted thereon.

Referring again to FIG. 10A, the station module 40 includes a row of ten light emitting diodes (LEDs) 106a mounted on the PCB 64 positioned beneath corresponding holes 106b formed in the top cover 102. The LEDs 106a are individually energized by the circuitry on the PCB 64 to provide a visible indication of the status of each of the ten stations. Illumination of the LEDs 106a can also be used as diagnostic indicators. A row of ten three-position toggle switches 108 are mounted on the top cover 102 of the station module 40. The toggle switches 108 can be manually actuated to select OFF, AUTO and ON states for each station. A row of ten screw terminals 110 are operatively connected to the drive circuits on the PCB 64. The screw terminals 110 are used for connecting individual dedicated field valve wires F (FIG. 3) on which the valve control signals can be transmitted to corresponding valves or valve-in-head sprinklers V installed around an irrigation site. The top cover 102 is molded with an access hole to fit around a terminal strip 111 (FIG. 10C). The terminal strip 111 includes ten individual receptacles defined by a plurality of divider walls 112 (FIG. 8) that separate each of the screw terminals 110. The divider walls 112 prevent a stripped terminal segment of one field valve wire F attached to one of the terminal screws 110 from accidentally touching the stripped segment of an adjacent field valve wire F or an adjacent one of the screw terminals 110. While screw terminals 110 are utilized in the irrigation controller 10 other forms of connectors can be used to connect the field valve wires F such as lever operated connectors that squeeze down on the stripped segments of the wires. Connectors without levers that can be manually manipulated to squeeze down on the stripped segments of the wires, connectors that receive mating connector portions crimped or soldered to the ends of the wires, electrical connectors with mating rotatable sleeves, and a wide variety other wire connection schemes.

Module grounding and power surge protection is provided in each of the station modules 40 by a plurality of surge protection circuits that route power surges to the backplane 32. When lightning strikes the area where the field valve wires F (FIG. 3) are buried a power surge enters the irrigation controller 10 via the screw terminals 110 (FIG. 8) of each of the station modules 40 which are also labeled as T1 in FIG. 10C. A combination of electrical components mounted on the PCB 64 of each station module 40 directs the power surge to specific mounting points on each of the PCBs 64. These electrical components form the surge protection circuits (FIG. 10D) that block the power surge from reaching the sensitive operational components 113 of the station module 40 including the drive circuits. The surge protection circuits shunt the power surge to conductors in the form of Copper traces with circular portions G1 (FIG. 10C) exposed that surround a pair of mounting holes 64a on opposite sides of the PCB 64.

Figure 10D:
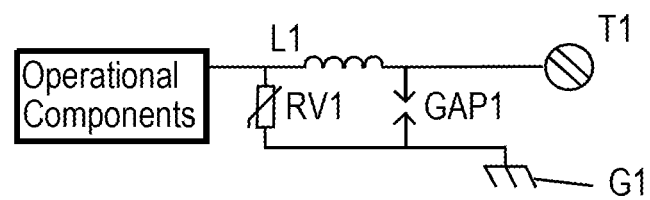
FIG. 10D is a schematic diagram illustrating a surge protection circuit that is duplicated on each of the station modules in connection with each of its ten stations.

Referring to FIGS. 10C and 10D, for each of the ten stations or zones, the primary blocking device included in each of the surge protection circuits is an inductor L1 connected to the screw terminal T1. The function of the inductor L1 is to delay the power surge until a gas discharge tube GAP1 has exceeded the impulse spark over voltage of ≤640V (100V/μS). When the gas discharge tube GAP1 has sparked over, the surge current will flow though the gas discharge tube GAP1. The majority of the power surge is then directed through the gas discharge tube GAP1 to the Copper traces that terminate in the circular portions G1. Surge energy that is blocked by the inductor L1, but energy over the capacity of the gas discharge tube GAP1, may jump to other Copper traces around the components connected to the Copper traces G1. Any surge current not blocked by the inductor L1 or shunted by the gas discharge tube GAP1, is shunted by a metal-oxide varistor RV1 to the Copper traces G1. Once the surge voltage is below the extinguishing voltage of the gas discharge tube GAP1 (~80V) and metal-oxide varistor RV1 (~45 VDC), the surge current will stop flowing through the electrical protection components.

Table I set forth hereafter lists suitable commercial electronic components for the power surge protection circuitry of the station modules 40.

TABLE I

| Component | Description | MFG | Part # |
|---|---|---|---|
| L1 | Inductor, 100 uH, 20%, 0.208 ohm res, 1.0 A | ACT | PR8X10-101K |
| GAP1 | Gas-Discharge Tube, 90 V, 8 mm, 2-pole | EPCOS | B88069X0720S102 |
| RV1 | MOV, 56VRMS, 14 mm, ERZ | Panasonic | V14D560 |

L1-L10, GAP1-GAP10 and RV1-RV10 are connected to screw terminals T1-T10 respectively.

Figure 11A:
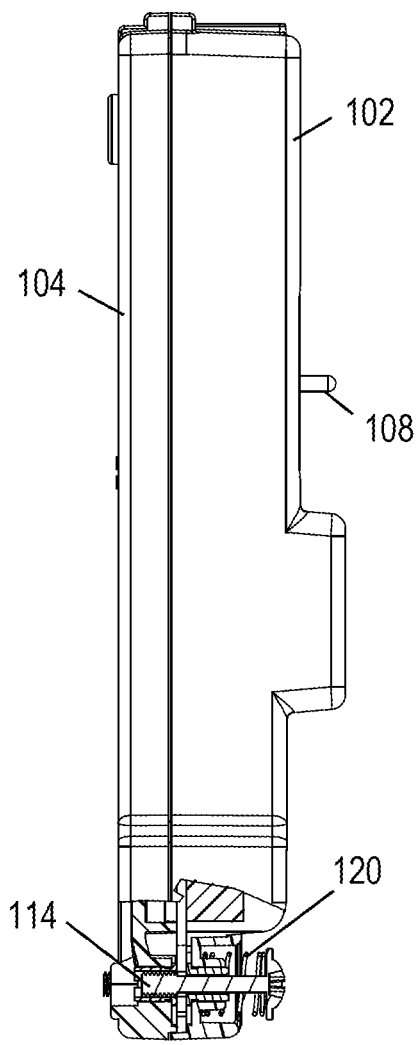
FIG. 11A is a side elevation view of the station module with portions broken away illustrating one of its captive mounting screws in its elevated unsecured position.
Figure 11B:
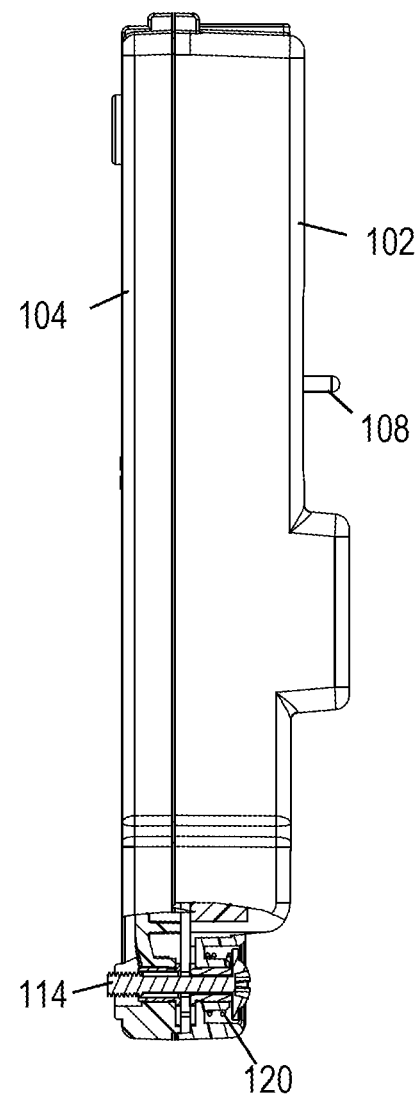
FIG. 11B is a view of the station module similar to FIG. 11A illustrating the captive mounting screw in its sunken secured position.
Figure 13:
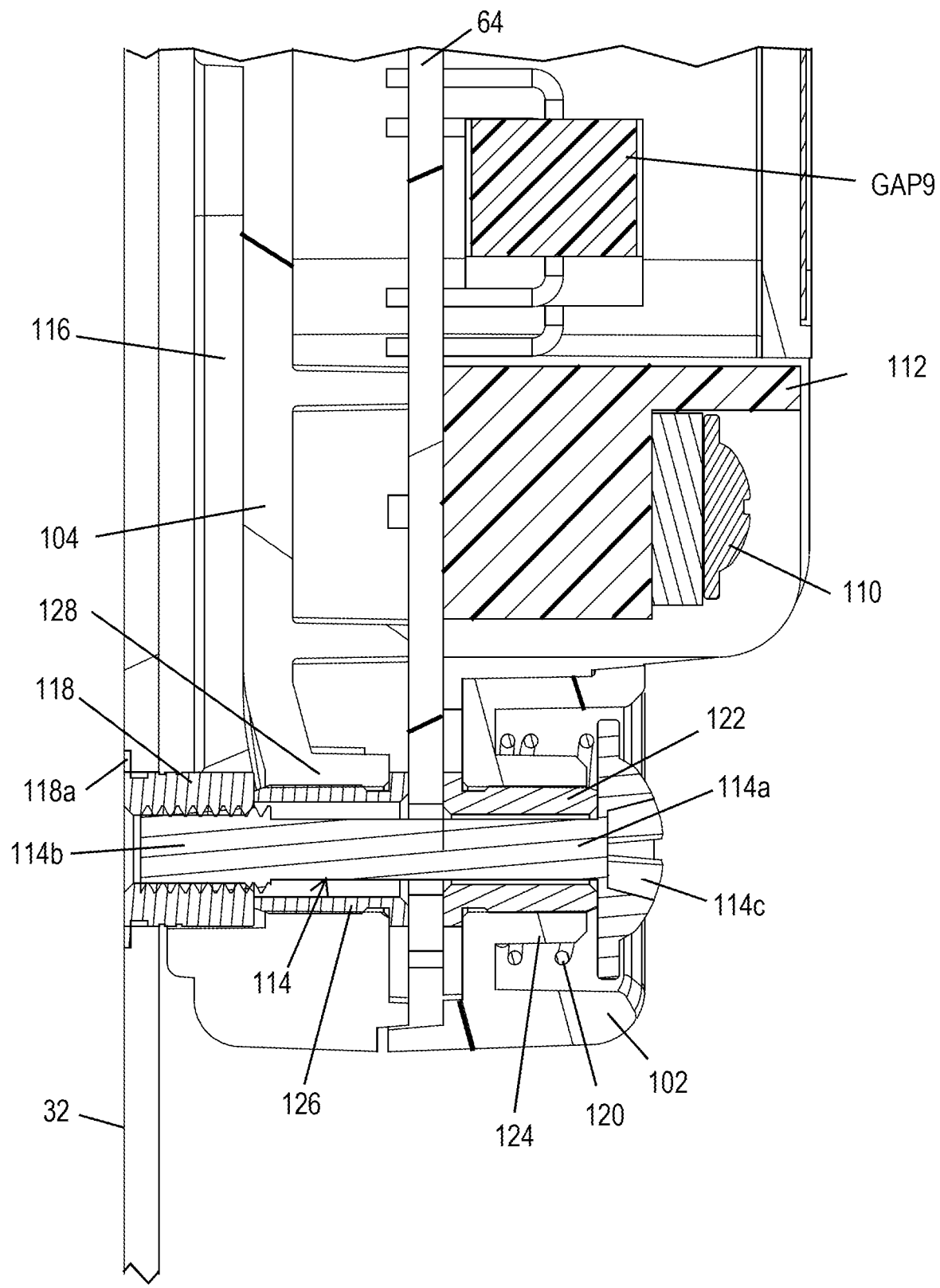
FIG. 13 is a greatly enlarged portion of FIG. 11B illustrating further details of the relationship of the captive mounting screw to the structure of the station module and the backplane when the captive screw is in its secured position. Further portions of the top and bottom covers of the station module are cut away in this view to reveal additional components of the station module such as one of the screw terminals for connecting a field valve wire.

Referring to FIG. 8, each station module 40 is configured for removable secure mounting on a corresponding region of the front backplane 32 using a pair of identical captive mounting screws 114 that pass through the mounting holes 64a (FIG. 10C). The captive mounting screws 114 (FIG. 8) are preferably made of a suitable metal, such as stainless steel alloy, so that they are electrically conductive and have sufficient strength and durability. Each captive mounting screw 114 has an elevated unsecured position illustrated on the left of FIG. 8 and a sunken secured position illustrated on the right in FIG. 8. The elevated unsecured position of the mounting screw 114, which can also be referred to as a popped up state, is also illustrated in FIGS. 9B and 11A. The sunken or recessed secured position of the mounting screw 114 is illustrated in FIGS. 11B and 13.

The bottom cover 104 of each station module 40 is formed with a pair of rain drop-shaped elongated slots 116 (FIG. 9C) on its lower right and left corners. The slots 116 act as cams or guides that receive and slide past a pair of raised nuts 118 (FIG. 14) on the backplane 32 to facilitate slide mounting of the station module 40. The user grasps the sides of the station module 40 in one hand and places it over the backplane 32 so that the raised nuts 118 enter the larger upper ends of the slots 116. The user then lifts the station module 40 and slides it vertically over the backplane 32 so that the portions of the bottom cover 104 that define the slots 116 slide past the raised nuts 118. Eventually, the conductive pins 56 (FIG. 10A) are plugged into mating female electrical connectors 58 (FIG. 10B) housed within the module connection housing 60 (FIG. 4). The raised nuts 118 are press fit into corresponding holes in the metallic backplane 32. The raised nuts have circular radially projecting flanges 118a that fit in recesses formed on the rear side of the backplane around the holes through which the raised nuts 118 are inserted. The raised nuts 118 ensure that a conductive path is formed through the mounting screws 114 to the backplane 32. The raised nuts 118 are made of suitable metal such as stainless steel alloy so that they form part of the robust ground path of the irrigation controller 10. A portion of this ground path extends from conductors on the PCB 64 in the form of conductive traces, through the mounting screws 114, through the raised nuts 118 to the metallic backplane 32, as explained hereafter in greater detail.

Each captive mounting screw 114 is held in its elevated unsecured position by a coil spring 120 (FIGS. 10A and 11A) which surrounds an undercut or small diameter unthreaded segment 114a of the shank of the mounting screw 114. The coil spring 120 has a suitable strength and dimension to urge the mounting screw 114 to its elevated unsecured position when the station module 40 is not mounted on the backplane 32. The larger diameter segment 114b of the shank of the mounting screw 114 has male threads sized to screw into mating female threads on the raised nut 118 has illustrated in FIG. 13. A first brass bushing 122 is snap fit into a cylindrical boss 124 formed in the top cover 102. The bushing 122 has female threads sized so that the male threaded segment 114b of the mounting screw 114 can be screwed into the same. After the mounting screw 114 is screwed through the bushing 122 it becomes captive in the sense that it will not fall out of the station module 40. This prevents the user from losing the mounting screw 114 in the field. A second brass bushing 126 is snap fit into a cylindrical boss 128 formed in the bottom cover 104.

The inner diameter of the bushing 126 (FIG. 13) is larger than the outer diameter of the male threaded segment 114b of the mounting screw 114. The inner diameter of the bushing 126 is also larger than the outer diameter of the unthreaded segment 114a of the mounting screw 114. The clearance between the unthreaded segment 114a and the bushing 126 is visible in FIG. 13. When the station module 40 is not mounted on the backplane 32, the coil spring 120 expands to keeps the mounting screw 114 popped up when the mounting screw is not threaded into its corresponding raised nut 118. This is done for ease of assembly, i.e. mounting the station module 40 on the backplane 32. The elevated unsecured position of the mounting screw 114 also provides the user with a visual indicator that the mounting screw 114 has not been screwed in to secure the station module 40 and establish the ground path. The reduced diameter of the unthreaded segment 114a of the mounting screw 114 allows the mounting screw to spin freely within the bushing 122 when the threaded segment 114b is not screwed into the corresponding raised nut 118. The mounting screw 114 has a Phillips head 114c that can be engaged and turned with a Phillips screw driver to screw the mounting screw 114 into the raised nut 118 until the head 114c engages the bushing 122.

The PCB 64 has conductors in the form of Copper traces that terminate in the circular portions G1 (FIG. 10C) and that are formed on both sides of the PCB 64. The circular portions G1 of these Copper traces are electrically contacted by the brass bushings 122 and 126. Referring to FIG. 13, the mounting screw 114, bushings 122 and 126, and raised nut 118 are dimensioned so that when the mounting screw 114 is tightened, the bushings 122 and 126 are squeezed against the circular portions of the Copper traces G1. These parts are also dimensioned so that when the mounting screw 114 is tightened the outer end of the bushing 126 is pressed against the inner end of the raised nut 118. The flanged inner end of the bushing 122 extends beyond the adjacent portions of the plastic top cover 102 to facilitate the making of an electrical connection between the bushing 122 and the circular portions of the Copper trace G1 on the top of the PCB 64. The outer end of the bushing 122 also extends beyond the plastic top cover 102 to facilitate the making of an electrical connection between the bushing 122 and the head 114c of the mounting screw 114 when the mounting screw is fully tightened. The outer end of the bushing 126 also extends beyond the plastic bottom cover 104 to facilitate the making of an electrical connection between the bushing 126 and the Copper trace G1 on the bottom of the PCB 64. The inner end of the bushing 126 also extends beyond the plastic bottom cover 104 to facilitate the making of an electrical connection between the bushing 126 and the raised nut 118.

A portion of the ground path leading from the station module 40 thus extends from the circular portion G1 of the Copper trace on the top side of the PCB 64, through the bushing 122, through the head 114c of the mounting screw 114c, through the segments 114a and 114b of the mounting screw 114, through the raised stainless steel nut 118, and into the Aluminum backplane 32. Another portion of the ground path leading from the station module 40 extends from the circular portion G1 of the Copper trace on the bottom side of the PCB 64, through the bushing 126, through the raised stainless steel nut 118, and into the Aluminum backplane 32. FIG. 11A illustrates the elevated position of the captive mounting screw 114 before the station module has been mounted on the backplane 32. FIG. 11B illustrates the lower or sunken position of the captive mounting screw 114 after the station module has been slide mounted on the backplane 32 and the mounted screw 114 has been tightened into the raised nut 118.

Figure 12:
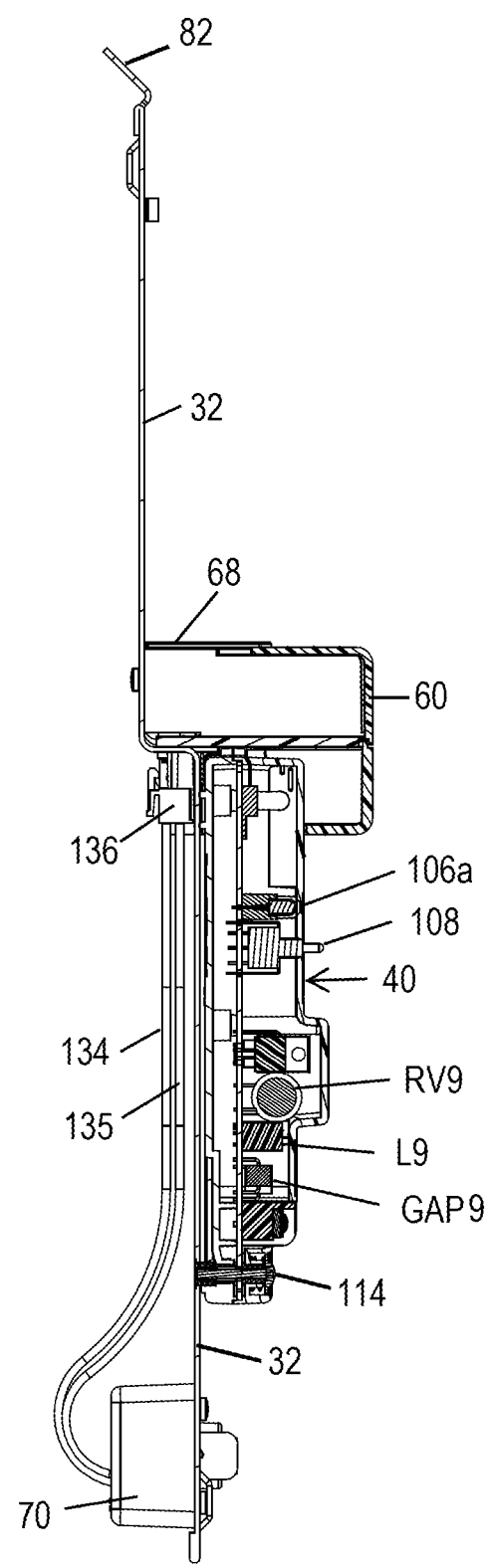
FIG. 12 is a vertical sectional view through one of the station modules mounted on the backplane taken along line 12-12 of FIG. 14 illustrating a wire that is connected between a backplane circuit board and a terminal block for the common wires.

FIG. 12 illustrates a first wire 134 that is connected between a backplane connector assembly 136 and the terminal block 70 for the valve common wires C. The connector assembly 136 is electrically connected to the PCB 64 in each of the station modules through the female electrical connectors 58 (FIG. 10B) housed within the module connection housing 60 (FIG. 4). A second wire 135 provides power to a test port 71 (FIG. 4). The test port 71 is always powered to allow a user to energize a valve to test the valve's operation.

Figure 14:
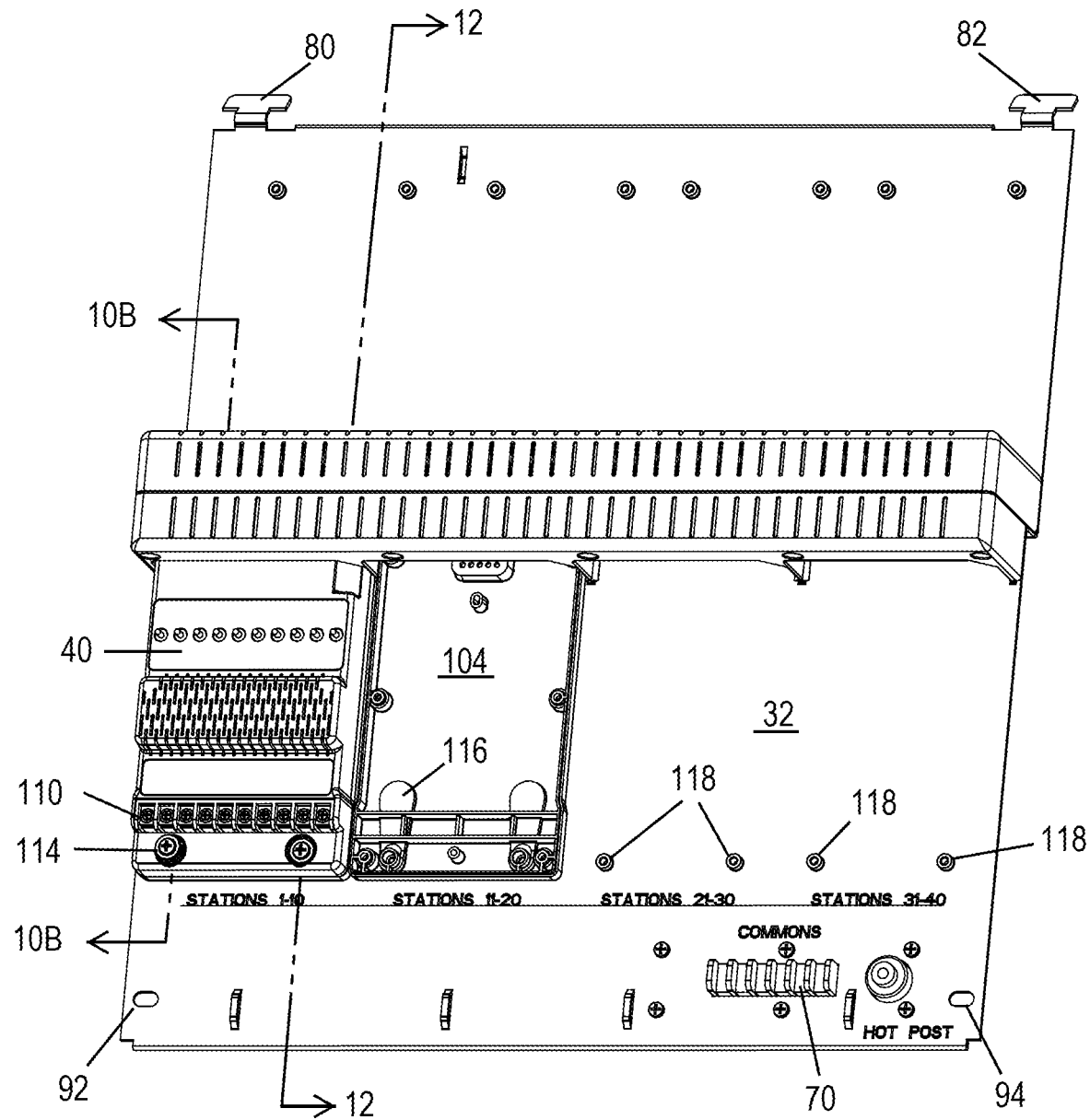
FIG. 14 is an enlarged isometric view of the backplane of the irrigation controller of FIG. 1 populated with only two station modules. The top cover and PCB of the station module for stations 11-20 have been removed to illustrate the relationship of the recesses in the bottom cover to the raised mounting nuts on the backplane.

FIG. 14 illustrates the backplane 32 when it is only populated with two station modules 40. The top cover 102 and the PCB 64 of the station module 40 for station Nos. 11-20 has been removed to illustrate the recesses 116 in the bottom cover 104 that receive the raised mounting nuts 118 on the backplane 32.

Figure 15A:
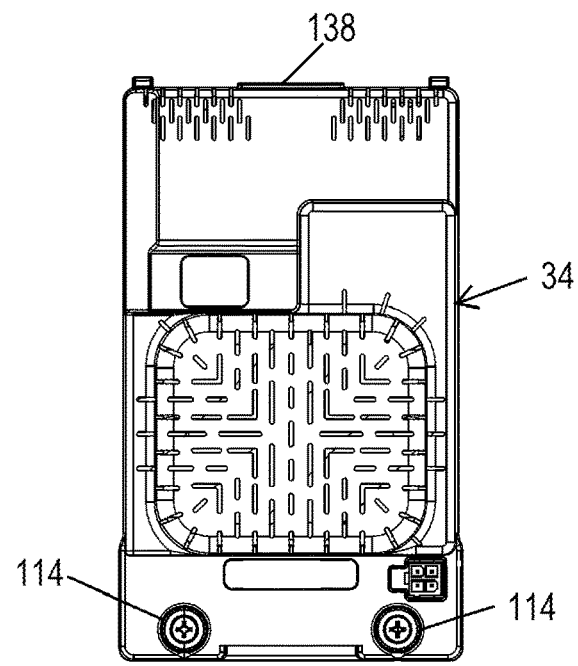
FIGS. 15A, 15B and 15C are enlarged front plan elevation, bottom end, and rear plan elevation views, respectively, of the power module of the irrigation controller of FIG. 1.
Figure 15B:
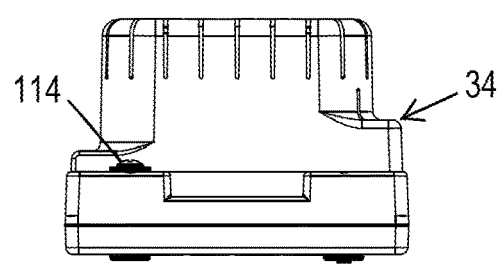
Figure 15C:
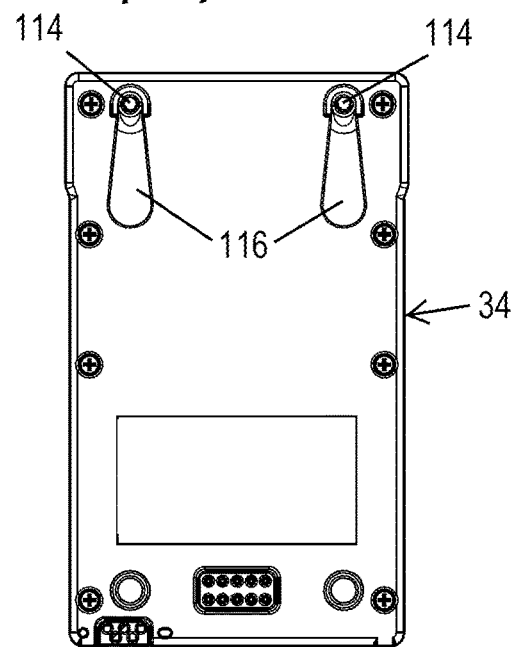
Figure 16:
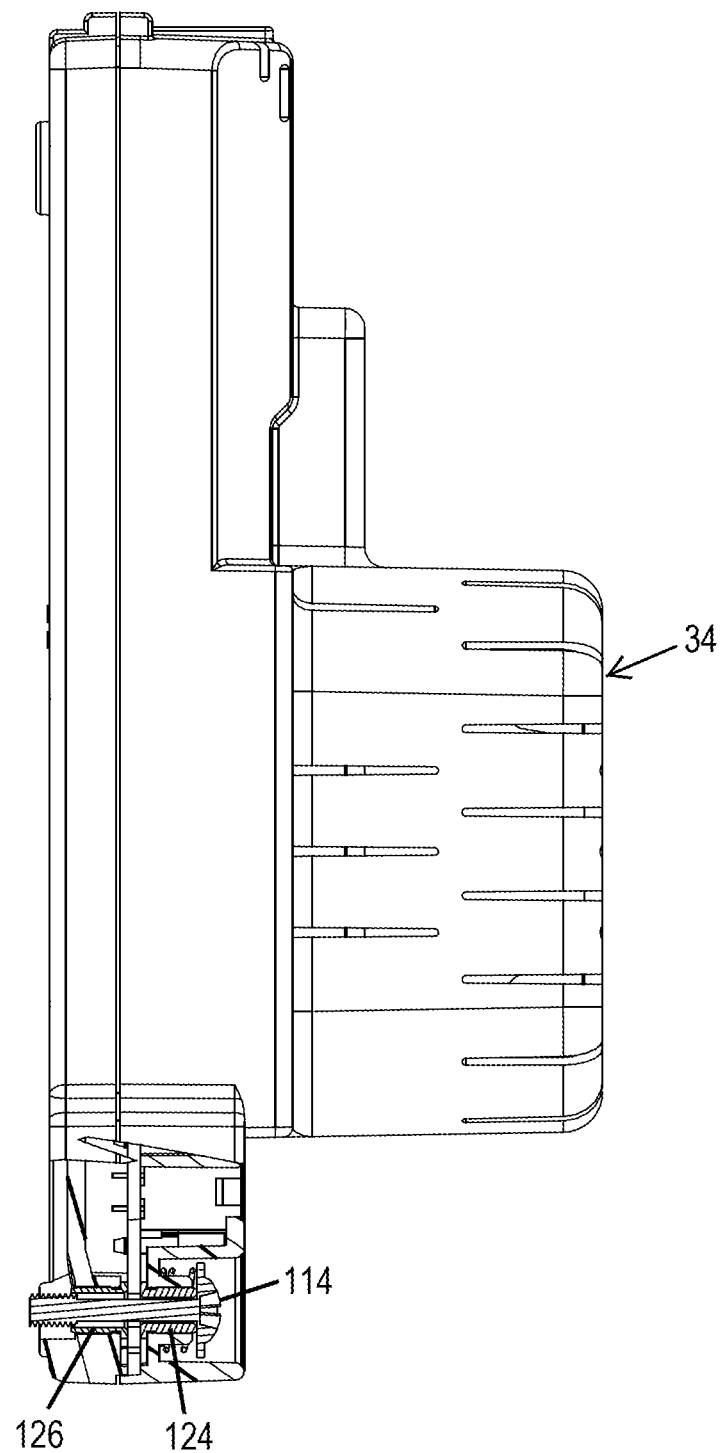
FIG. 16 is a further enlarged side elevation view of the power module with portions broken away to reveal one of its captive mounting screws.

FIGS. 15A, 15B and 15C are enlarged front plan elevation, bottom end, and rear plan elevation views, respectively, of the power module 34. The power module 34 has its own internal PCB (not illustrated) that carries the power circuitry for delivering the DC power required by the main processor P of the face pack 12 and the AC power required by the station modules 40. Referring to FIG. 16, the mechanical construction of the power module 34 and the manner in which it is mechanically mounted on the front backplane 32 with a pair of captive mounting screws 114 is similar to that described in connection with the station modules 40. The power module 34 has a plurality of male conductor pins (not illustrated) in a connector assembly 138 that are plugged into corresponding female electrical connectors 58 inside the louvered module connection housing 60 (FIG. 4).

Figure 17A:
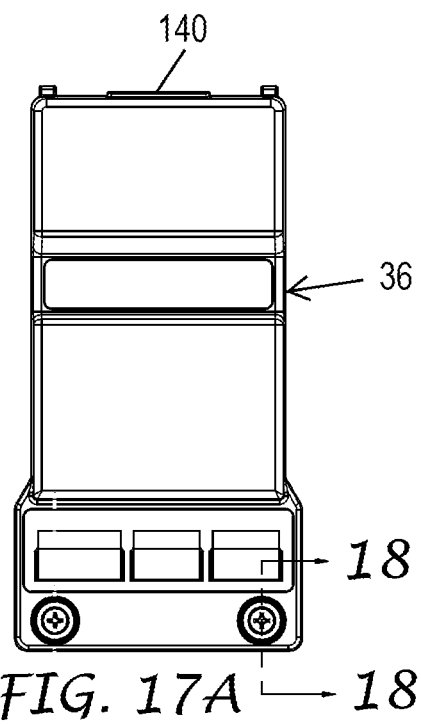
FIGS. 17A, 17B and 17C are enlarged front plan elevation, bottom end, and rear plan elevation views, respectively, of the four wire communications module of the irrigation controller of FIG. 1.
Figure 17B:
Figure 17C:
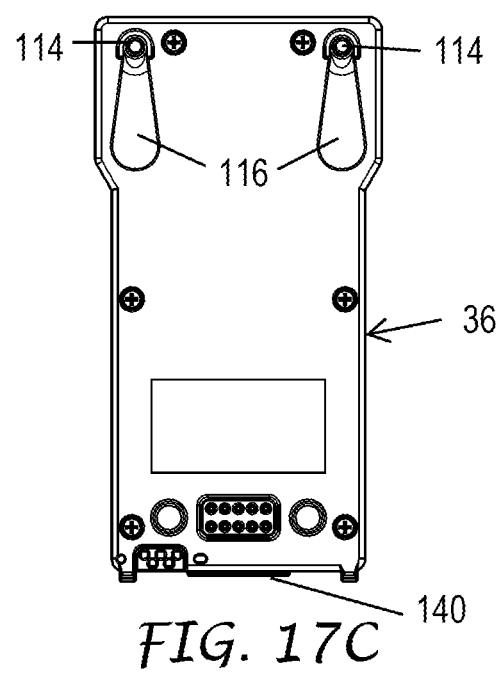
Figure 18:
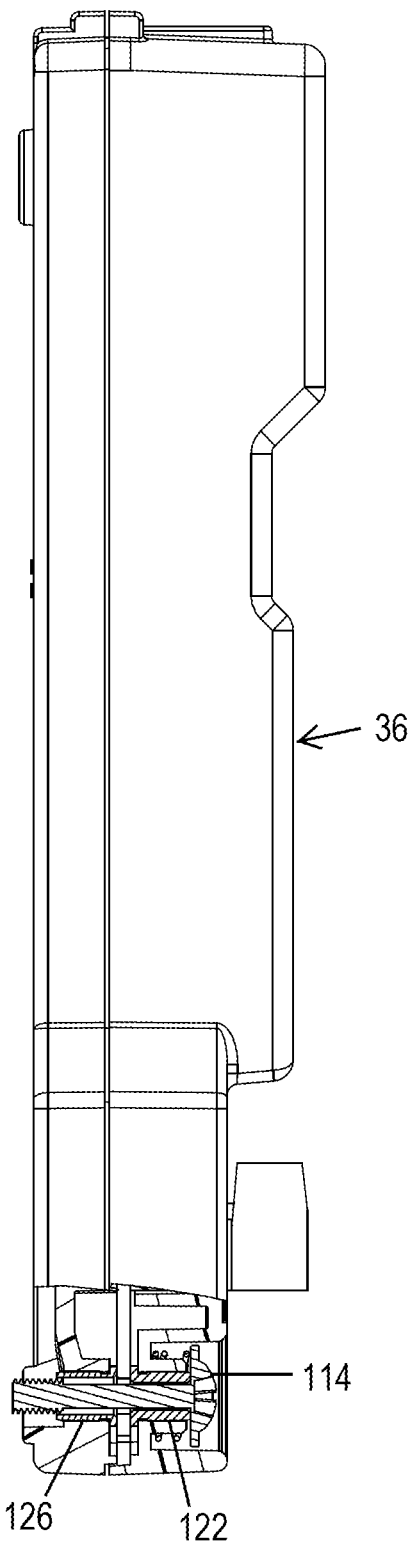
FIG. 18 is a further enlarged side elevation view of the four wire communications module with portions broken away to reveal one of its captive mounting screws.

FIGS. 17A, 17B and 17C are enlarged front plan elevation, bottom end, and rear plan elevation views, respectively, of the four wire communications module 36. The four wire communications module has its own internal PCB (not illustrated) that carries circuitry for communicating via a hard wired connection to a central control unit (not illustrated). As illustrated in FIGS. 17C and 18, the mechanical construction of the four wire communications module 36 and the manner in which it is mechanically mounted on the front backplane 32 with a pair of captive mounting screws 114 is similar to that described in connection with the station modules 40. The four wire communications module 36 a plurality of male conductor pins (not illustrated) in a connector assembly 140 that are plugged into corresponding female electrical connectors 58 inside the louvered module connection housing 60 (FIG. 4).

Figure 19:
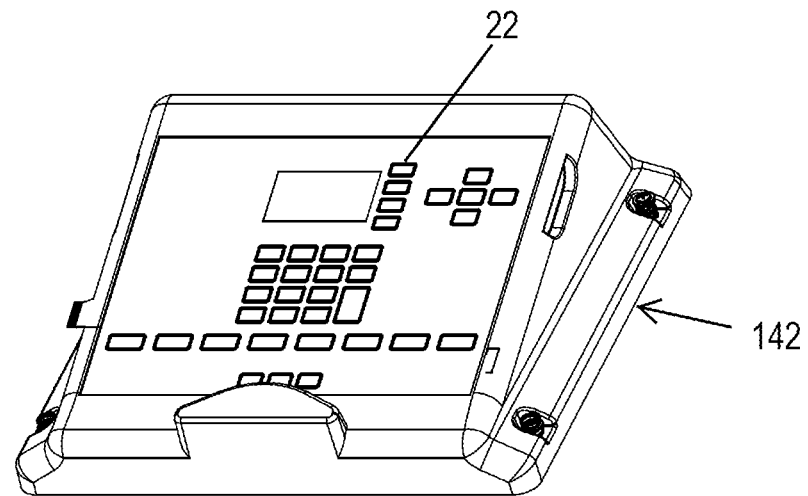
FIG. 19 is an enlarged isometric view of the face pack housing of the irrigation controller of FIG. 1 taken from the top side thereof.
Figure 20:
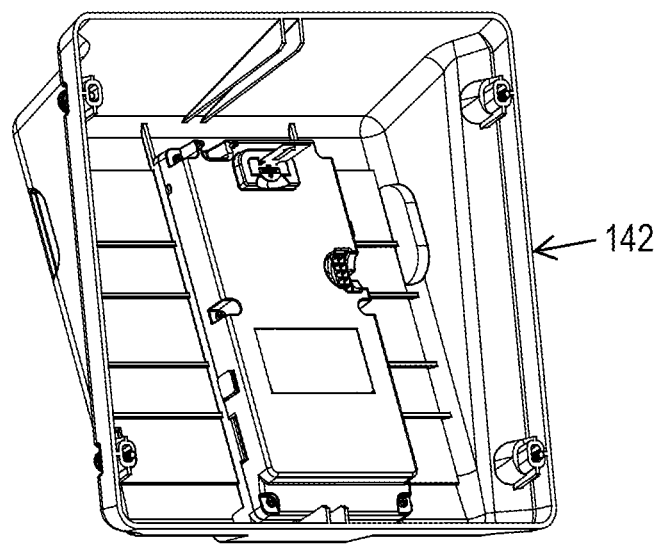
FIG. 20 is an enlarged isometric view of the face pack housing from the bottom side thereof.
Figure 21:
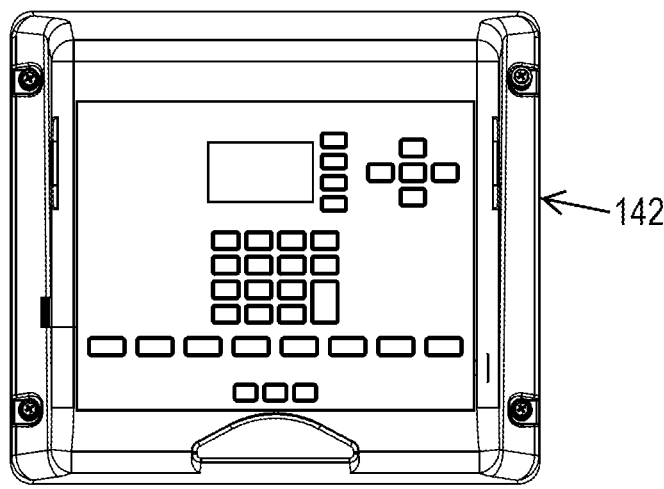
FIG. 21 is a top plan view of the face pack housing.
Figure 22:
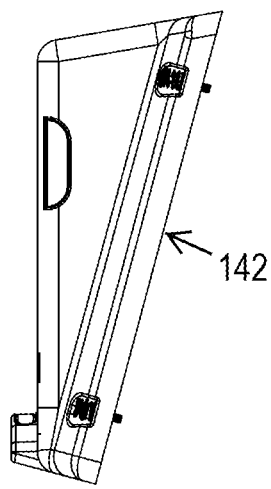
FIG. 22 is a side elevation view of the face pack housing taken from the right side of FIG. 21.
Figure 23:
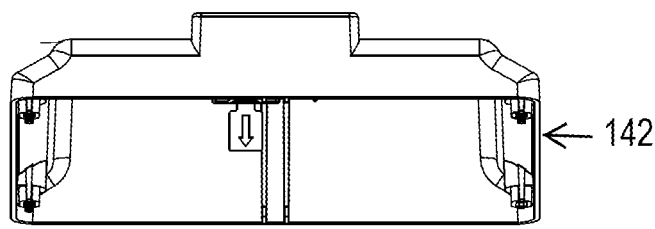
FIG. 23 is a front elevation view of the face pack housing.
Figure 24:
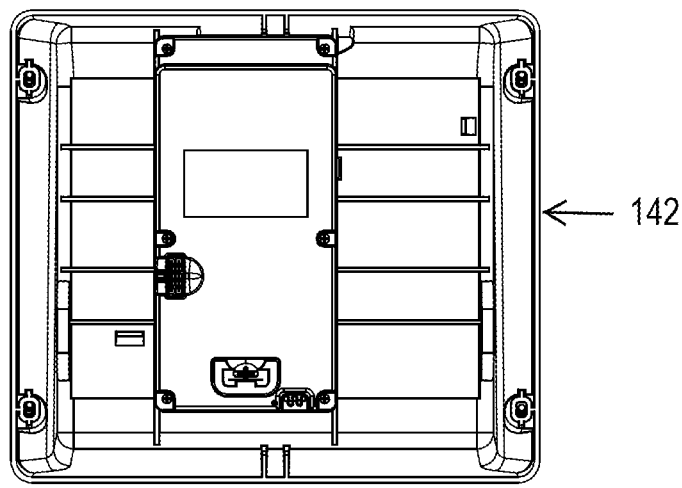
FIG. 24 is a bottom plan view of the face pack housing.

FIG. 19 is an enlarged isometric view of the housing 142 of the face pack 14 from the top side thereof illustrating its ornamental design. FIG. 20 is an enlarged isometric view of the face pack housing 142 from the bottom side thereof further illustrating its ornamental design. FIG. 21 is a top plan view of the face pack housing 142 further illustrating its ornamental design. FIG. 22 is a side elevation view of the face pack housing 142 taken from the right side of FIG. 21 further illustrating its ornamental design. The left side of the face pack housing 142 has an identical design. FIG. 23 is a front elevation view of the face pack housing 142 with the top surface orientated in the horizontal position further illustrating its ornamental design. FIG. 24 is a bottom plan view of the face pack housing 142 further illustrating its ornamental design.

FIG. 25 illustrates an alternate embodiment of the present invention in the form of an irrigation controller 10' that is configured as a decoder controller. It is has a structure similar to that of the modular irrigation controller 10 illustrated in FIGS. 1-3. A rear metallic backplane 144 (FIG. 26) having a mounting configuration identical to the backplane 32 is attached in a similar fashion to the rear sides of the left and right grounding brackets 44 and 54. The rear backplane 144 is grounded in the same fashion that the front backplane 32 is grounded. A pair of power supplies 146 and 148 are mounted to the rear backplane 144. The power supplies 146 and 148 are grounded through the rear backplane 144. Four encoder modules 150 (FIG. 25) are mounted on the front backplane 32 instead of the station modules 40. The encoder modules 150 have drive circuits that generate valve control signals that are sent on a pair of wires that connect from the module to valve to valve to valve. Each valve has a decoder circuit connected between the pair of wires and the solenoid that determines if a unique valve ID code has been encoded on the power signal, in which case the valve with that valve ID code is turned ON by allowing the power signal to energize the solenoid. Each encoder module 150 incorporates the same mounting and grounding structure as the previously described modules including the captive mounting screws 114 and the bushings 122 and 126 on each side of the PCB housed within the encoder module 150 that provide the grounding paths from the PCB to the backplane 32. For more details regarding the circuitry of the encoder modules 150, see U.S. Pat. No. 7,069,115 of Peter J. Woytowitz granted Jun. 27, 2006 entitled "Hybrid Modular/ Decoder Irrigation Controller," the entire disclosure of which is hereby incorporated by reference. Said patent is also assigned to Hunter Industries, Inc. The number of power supplies that need to be mounted on the rear backplane 144 depends on the number of valves or valve-in-head sprinklers V that will be simultaneously turned ON by the decoder irrigation controller 10'.

The irrigation controllers 10 and 10' are usually mounted in an outdoor environment, often without any protection from the elements. Each of these controllers has an identical pedestal 12. The pedestal 12 is designed with an integral water management system to ensure that water that enters the upper portion of the pedestal 12 is drained away from the pedestal 12 in a manner that ensures that none of it reaches its electronic components and damages the same.

When the top cover 16 is opened to access the face pack 14, rain water and water sprayed onto the pedestal 12 from an adjacent sprinkler collects in the upwardly opening receptacle 26 (FIG. 27) that surrounds the face pack 14. Some of this water exits the receptacle 26 through recesses 152, 154 and 156 formed in the pedestal 12. The front and rear sides of the upper portion of the pedestal 12 are formed with similar recesses. The recesses 152, 154, and 156 are formed to provide the ability to easily remove the front door 30. The recess 154 is large enough to allow a user to fit his or her hand into the recess 154 and pull on the front door 30 to remove the same from the pedestal 12. If the front door 30 is fit too tight within the pedestal 12 to permit easy manual removal, a tool (not illustrated) can be used into the slots 152 and 156 to facilitate removal of the front door 30.

Figure 26:
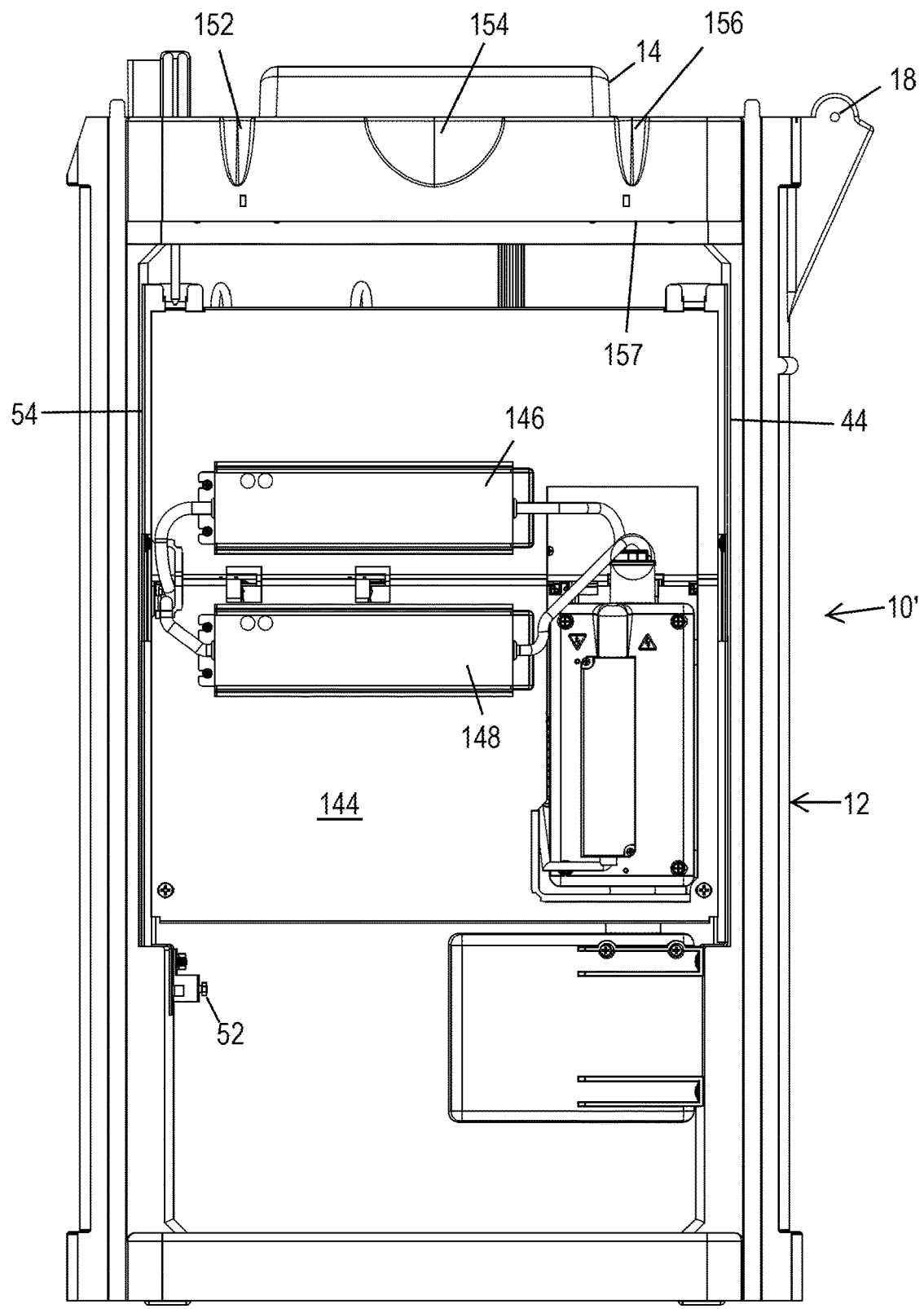
FIG. 26 is an enlarged rear elevation view of the irrigation controller of FIG. 25 with its rear door removed to show a pair of power supplies installed on the rear backplane of the irrigation controller.

The water collected in the areas of the recesses 152, 154, and 156 FIG. 26) drains in the space between the frame of the pedestal 12 and the front door 30 to a water drip trough 164 (FIG. 28A) formed in the front door 30. Additionally, any other water that is collected between the pedestal 12 and the front door 30 is directed to the drip trough 164. Both the front door 30 and the rear door of the pedestal have an identical configuration. A downwardly facing surface 157 (FIG. 26) at the top of the frame of the pedestal 12 mates with the peripheral lip 158 on the front door 30 and holds the front door 30 and the rear door in position when the top cover 16 is open. The raised peripheral lip 158 also prevents water from entering the portion of the interior of the pedestal 12 that contains the backplanes 32 and 144 and the electronic components mounted on these backplanes. An upper peripheral lip 159 (FIG. 28D) on the front door 30 fits in a recess (not illustrated) of the top cover 16 so that the front door 30 is securely held in place with the cover 16 is closed. The front door 30 can only be removed when the cover 16 is open so the interior of the pedestal 12 not accessible when the top cover 16 is locked in its closed position. A truncated cylindrical recess 160 (FIG. 27) formed in the upper portion of the pedestal 12 is used to conveniently store a Phillips screwdriver (not illustrated). All of the fasteners in the irrigation controller 10 are identical Phillips screws that can be screwed in and removed with this screw driver. The upper portion of the pedestal 12 is formed with four drain holes 162, one at each corner, for draining water from the receptacle 26. Only the two rear drain holes 162 are visible in FIG. 27.

The structure of the front door 30 is illustrated in detail in FIGS. 28A-28D. The doors fit between vertical side walls 12a and 12b (FIG. 1) of the pedestal 12 with interlocking edges. The doors could also be mounted on hinges.

As previously indicated, the rear door of the pedestal 12 has an identical configuration and therefore only the configuration of the front door 30 is described. The upper portion of the front door 30 is formed with the drip trough 164 (FIG. 28A) on its interior side. The drip trough 164 has an upwardly opening cross-section with the interior of the door surface providing one vertical side and the peripheral lip 158 forming the other vertical side. The drip trough 164 has an intermediate peak 164a and gradually slopes to a pair of drain holes 166 formed at each end of the drip trough 164. Water that drains from the recesses 152, 154 and 156 (FIG. 27) and between the pedestal 12 and the front door 30 is captured in the drip trough 164 and then drains through the drain holes 166 (FIG. 28A) into the interior of the hollow front door 30. The upper edge of the peripheral lip 158 fits tight against the downwardly facing surface 157 (FIG. 26) of the pedestal 12 when the front door 30 is installed in the pedestal. Water that drains into the drain holes 166 passes through the hollow front door 30 and drains out of the front door 30 through drain holes 168 (FIG. 28C) formed in the bottom of the front door 30.

Figure 27:
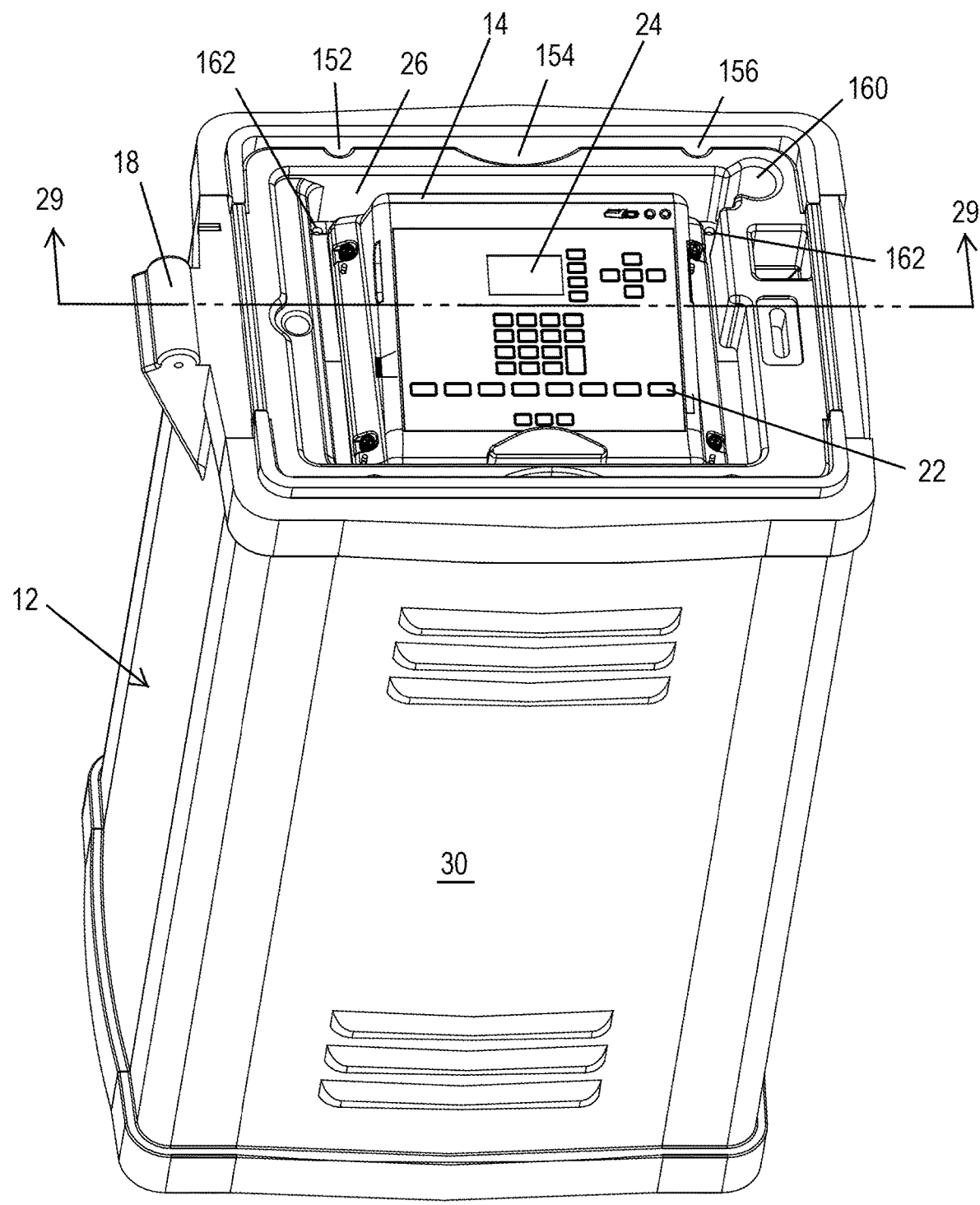
FIG. 27 is an isometric view of the irrigation controller of FIG. 1 taken from above in FIG. 2A with its top cover removed and its front door installed.
Figure 28A:
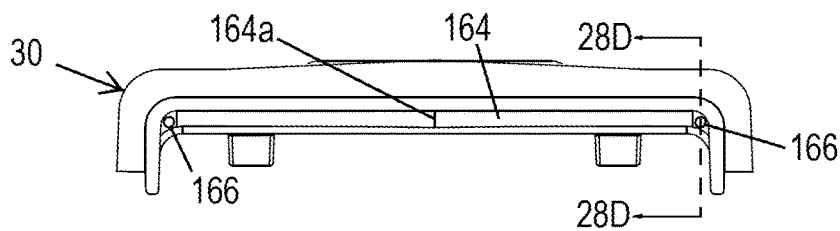
FIGS. 28A, 28B, and 28C are top end elevation, rear plan, bottom end elevation views of the front door, respectively.
Figure 28B:
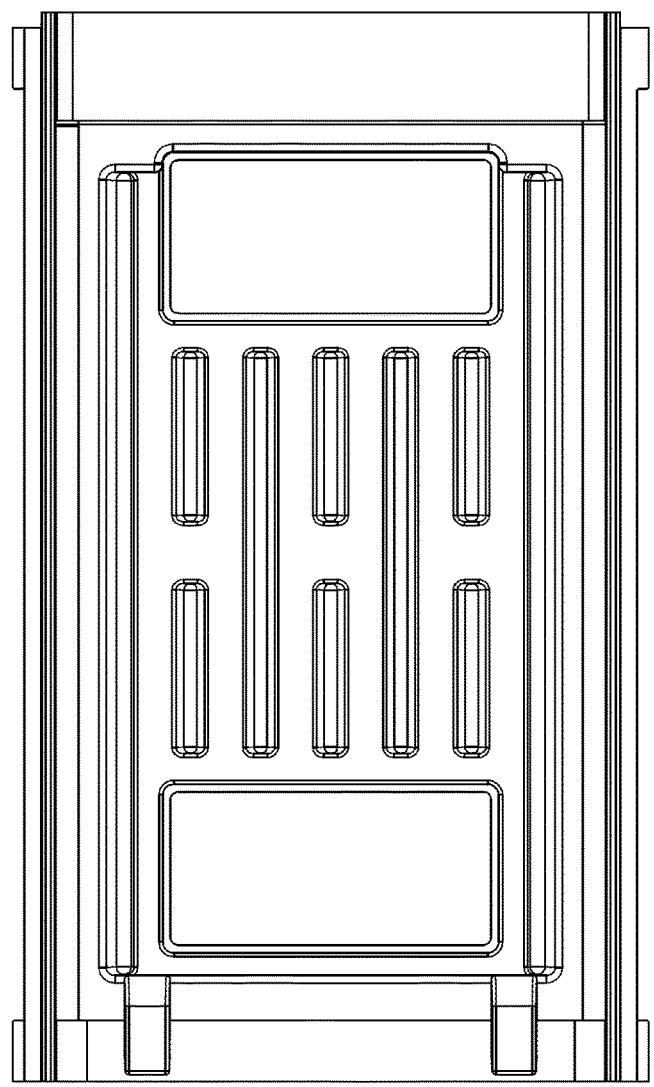
Figure 28D:
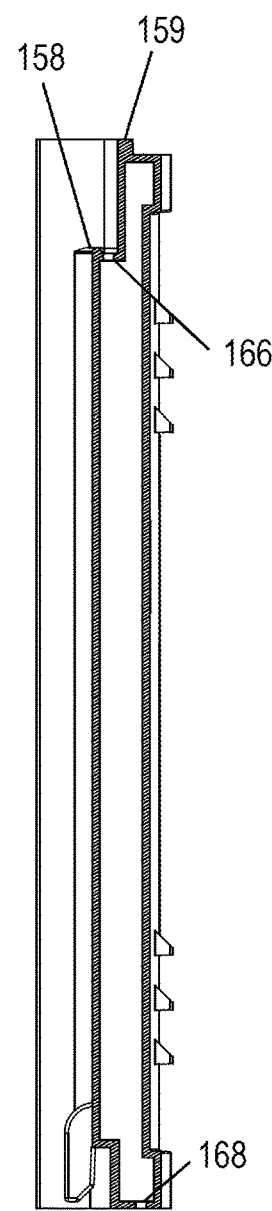
FIG. 28D is a vertical sectional view of the front door taken along line 28D-28D of FIG. 28A.
Figure 28C:
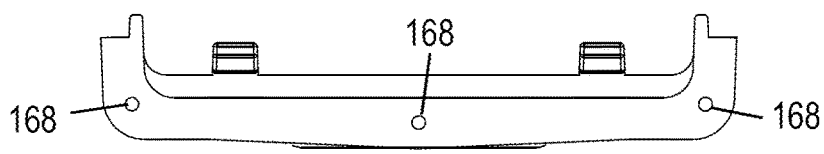
Figure 29:
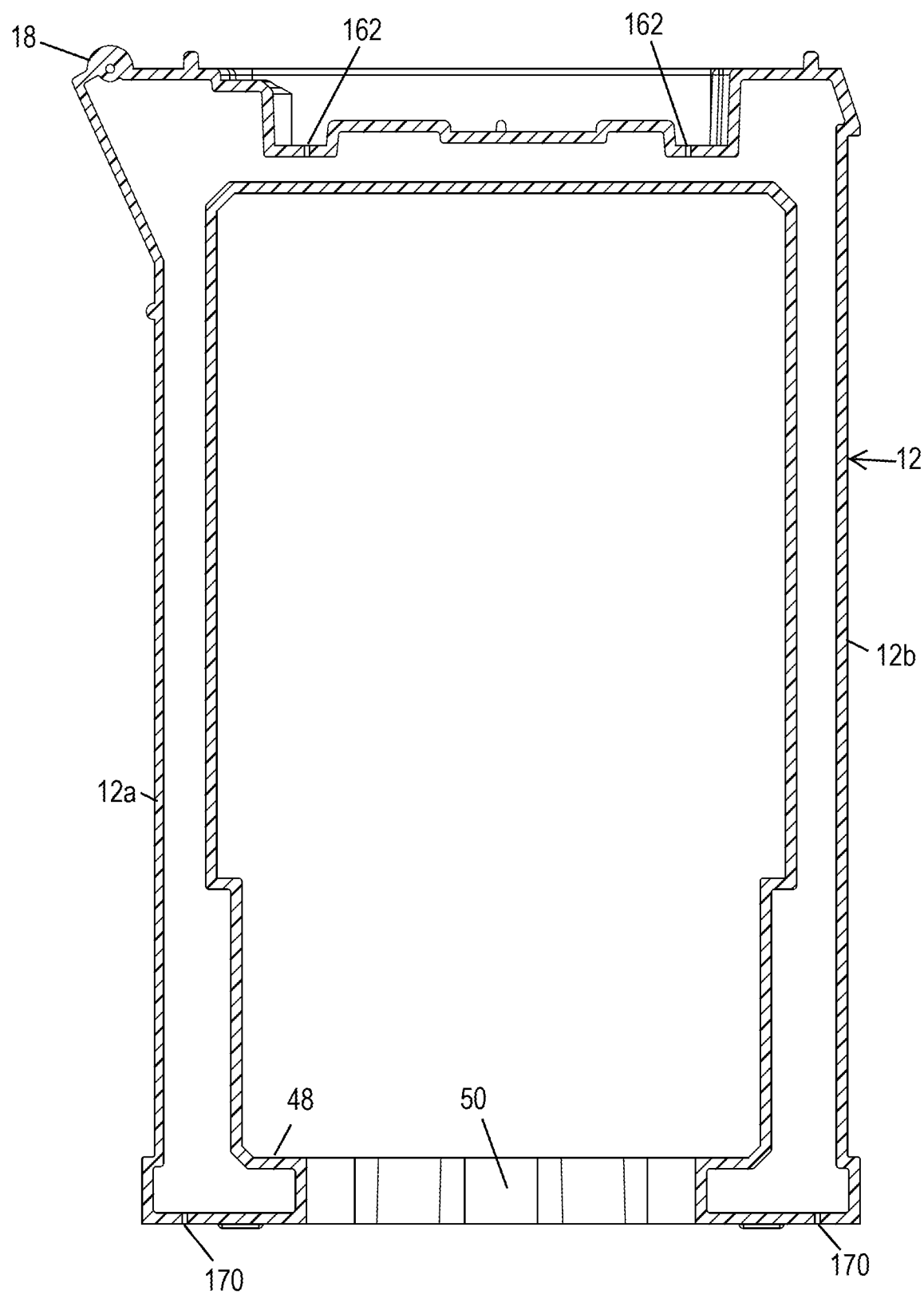
FIG. 29 is a vertical sectional view through the pedestal of the irrigation controller of FIG. 1 taken along line 29-29 of FIG. 27.

Referring to FIGS. 27 and 29, water that drains from the receptacle 26 through the drain holes 162 enters the hollow interior of the side walls 12a and 12b of the pedestal 12. This water flows through the hollow side walls 12a and 12b and exits the pedestal 12 through drain holes 170 formed in the lower ends of the sidewalls 12a and 12b.

While we have described two embodiments of an irrigation controller with a robust ground path, it will be apparent to those skilled in the art of designing irrigation controllers that our invention can be modified in both arrangement and detail. For example, the wire connection terminals for connecting field valve lines need not be mounted on the station modules 40, but can be separately mounted so that station modules 40 can be repaired or replaced without having to disconnect and re-connect all of the field valve wires associated with that station module. See U.S. Pat. No. 7,289,886 of Peter J. Woytowitz granted Oct. 30, 2007 and entitled "Modular Irrigation Controller with Separate Field Valve Line Wiring Terminals", the entire disclosure of which is hereby incorporated by reference. Said patent is also assigned to Hunter Industries, Inc. In such a case the separate field valve wire terminals are each connected to the robust ground path that includes the station modules 40 and their mounting screws 114. Therefore the protection afforded our invention should only be limited in accordance with the following claims.

What is claimed is:

1. A pedestal for an electronic landscape controller, the pedestal comprising:
    a frame having a hollow interior sized and shaped to receive one or more electronic components and an opening into the hollow interior;
    a door supportable by the frame and movable between an open configuration and a closed configuration, the door being sized and shaped to cover at least a portion of the opening when in the closed configuration, the door having a hollow interior, an upper drain hole for water to enter the hollow interior, and a lower drain hole for the water to exit the door and the pedestal;
    a receptacle formed in the frame at a location above the hollow interior and configured to receive at least a portion of a control panel, the receptacle having a plurality of side walls, a bottom wall, and an upward opening;
    a space formed outside the receptacle and between a sidewall of the plurality of sidewalls of the receptacle and the door at least when the door is in the closed configuration; and
    a drip trough, at least a portion of the drip trough being disposed relative to the space to route the water entering the space to the upper drain hole in the door.

2. The pedestal according to claim 1, further comprising a top cover configured to move between an open configuration and a closed configuration, the top cover covering the receptacle when in the closed configuration.

3. The pedestal according to claim 1, wherein the receptacle surrounds the control panel.

4. The pedestal according to claim 1, wherein the space comprises at least one recess, and wherein the at least one recess is sized and shaped to allow a user to move the door from the closed configuration to the open configuration.

5. The pedestal according to claim 4, wherein the at least one recess is sized and shaped to receive at least a portion of a hand of the user.

6. The pedestal according to claim 4, wherein the at least one recess is sized and shaped to receive a tool.

7. The pedestal according to claim 1, wherein the frame further comprises a downwardly facing surface, and wherein the door comprises a peripheral lip configured to mate with the downwardly facing surface to inhibit the water entering the space from entering the hollow interior of the frame at least when the door is in the closed configuration.

8. The pedestal according to claim 7, wherein the peripheral lip is located above the upper drain hole in the door.

9. The pedestal according to claim 1, wherein the door further comprises at least a portion of the drip trough.

10. The pedestal according to claim 1, wherein the drip trough comprises an upwardly opening cross-section defined at least in part by the door and the frame when the door is in the closed configuration.

11. The pedestal according to claim 1, wherein a least a portion of the drip trough is sloped to route the water entering the space towards the upper drain hole in the door.

12. A pedestal for an electronic landscape controller, the pedestal comprising:
    a frame having a hollow interior, at least one side wall, and an opening into the hollow interior, the hollow interior being sized and shaped to receive one or more electronic components, the at least one side wall having a hollow interior and a lower drain hole;
    a door supportable by the frame and movable between an open configuration and a closed configuration, the door being sized and shaped to cover at least a portion of the opening when in the closed configuration;
    a receptacle formed in the frame at a location above the hollow interior and configured to receive at least a portion of a control panel, the receptacle having a plurality of side walls, a bottom wall, and an upward opening; and
    an upper drain hole disposed between the receptacle and the hollow interior of the at least one side wall so as to provide a flow path for the water in the receptacle to enter the hollow interior before flowing through the hollow interior of the at least one side wall and exiting the pedestal via the lower drain hole.

13. The pedestal according to claim 12, further comprising a top cover configured to move between an open configuration and a closed configuration, the top cover covering the receptacle when in the closed configuration.

14. The pedestal according to claim 12, wherein the receptacle surrounds the control panel.

15. The pedestal according to claim 12, wherein the upper drain hole is disposed in the bottom wall of the receptacle.

16. The pedestal according to claim 12, wherein the lower drain hole is disposed in a bottom surface of the at least one side wall.

17. A pedestal for an electronic landscape controller, the pedestal comprising:
- a frame having a hollow interior, a side wall, and an opening into the hollow interior, the hollow interior being sized and shaped to receive one or more electronic components;
- a door supportable by the frame and movable between an open configuration and a closed configuration, the door being sized and shaped to cover at least a portion of the opening when in the closed configuration;
- a receptacle formed in the frame at a location above the hollow interior and configured to receive at least a portion of a control panel, the receptacle having a plurality of side walls, a bottom wall, and an upward opening;
- a space formed outside the receptacle and between a side wall of the plurality of side walls of the receptacle and the door at least when the door is in the closed configuration;
- a first drainage path for water to flow from the space and through the door before exiting the pedestal; and
- a second drainage path for water to flow from the receptacle and through the side wall before exiting the pedestal.

18. The pedestal as in claim 17, wherein the first drainage path is separate from the second drainage path.

19. The pedestal as in claim 17, wherein the first drainage path comprises:
- a drip trough; and
- an interior of the door.

20. The pedestal as in claim 17, wherein the second drainage path comprises:
- a drain hole in the bottom wall of the receptacle; and
- an interior of the side wall.

* * * * *

UNITED STATES PATENT AND TRADEMARK OFFICE
CERTIFICATE OF CORRECTION

PATENT NO. : 10,967,395 B2  
APPLICATION NO. : 16/552222  
DATED : April 6, 2021  
INVENTOR(S) : Richard C. Stange et al.

Page 1 of 1

It is certified that error appears in the above-identified patent and that said Letters Patent is hereby corrected as shown below:

On the Title Page

On page 2, in Column 1, item (56), U.S. Patent Documents, Line 12, delete "6,786,691" and insert -- 6,786,961 --.

On page 2, in Column 2, item (56), U.S. Patent Documents, Line 27, delete "Malula" and insert -- Matula, Jr. --.

In the Specification

In Column 1, Line 54, delete "a" and insert -- at --.

In Column 2, Line 13 (approx.), delete "a" and insert -- at --.

In Column 7, Line 51, delete "wires. Connectors" and insert -- wires, connectors --.

In Column 8, Line 26 (approx.), delete "(~80V)" and insert -- (~80 V) --.

In Column 8, Line 40 (approx.), delete "56VRMS," and insert -- 56 VRMS, --.

In Column 9, Line 49, delete "keeps" and insert -- keep --.

In Column 12, Line 32, delete "FIG. 26)" and insert -- (FIG. 26) --.

In the Claims

In Column 14, Line 34 (approx.), Claim 11, delete "a" and insert -- at --.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*